United States Patent [19]

Zimmerman

[11] Patent Number: 5,563,358
[45] Date of Patent: Oct. 8, 1996

[54] MUSIC TRAINING APPARATUS

[76] Inventor: Thomas G. Zimmerman, 72A W. Wyoming Ave., #3, Melrose, Mass. 02176

[21] Appl. No.: 198,254

[22] Filed: Feb. 18, 1994

Related U.S. Application Data

[63] Continuation-in-part of Ser. No. 803,035, Dec. 6, 1991, Pat. No. 5,287,789.

[51] Int. Cl.$^6$ .................................................. G09B 15/02
[52] U.S. Cl. .......................................... 84/477 R; 84/454
[58] Field of Search ........................ 84/470 R, 477 R, 84/478, 454; 434/307 R

[56] References Cited

U.S. PATENT DOCUMENTS

| | | | |
|---|---|---|---|
| 3,876,936 | 4/1975 | Lester et al. | 84/454 |
| 3,919,913 | 11/1975 | Shrader | 84/454 |
| 4,063,035 | 12/1977 | Appleman et al. | 179/1 SP |
| 4,273,023 | 6/1981 | Mercer | 84/454 |
| 4,321,853 | 3/1982 | Tumblin | 84/454 |
| 4,378,466 | 3/1983 | Esser | 84/464 R |
| 4,416,182 | 11/1983 | Wise et al. | 84/470 R |
| 4,429,609 | 2/1984 | Warrender | 84/454 |
| 4,580,133 | 4/1986 | Matsuoka et al. | 340/701 |
| 4,969,194 | 11/1990 | Ezawa et al. | 381/48 |
| 5,070,754 | 12/1991 | Adamson | 84/454 |

OTHER PUBLICATIONS

Fairlight Instruments, Pty. Ltd.: Fairlight Voicetracker Model VT-5 Preliminary User's Manual, Jan., 1985.
Fundamental–Harmonic Extraction/Manual Preset and Tunable Filters, pp. 174 and 175.
Kuhn, William B.: "A Real–Time Pitch Recognition Algorithm for Music Applications", Computer Music Journal, vol. 14, No. 3, Fall, 1990.
Nickerson, et al.: "Computer–Aided Speech Training for the Deaf", Journal of Speech and Hearing Disorders, Feb. 1976, vol. 41, No. 1.

*Primary Examiner*—Patrick J. Stanzione
*Attorney, Agent, or Firm*—Haynes & Davis

[57] ABSTRACT

An apparatus to assist the musical instruction of a student including one or more tone sources (e.g. flute, human voice, violin) playing monophonically as inputs, means to quantify aural parameters of pitch, amplitude, duration, and timbre of inputs, means to visually store and represent temporal history of said, means to store and playback audio signal of inputs, and means to arrive at and display musical related pitches. A digital waveform analyzer is used to control a tunable low-pass filter in the pitch tracker and preform spectral estimation of timbre. Also, a digital version is described. Pre-recorded music instruction and a karaoke player are used as examples of reference tone sources. Visual representation of aural parameters can be provided as video output.

29 Claims, 11 Drawing Sheets

1

MUSIC TRAINING APPARATUS

CONTINUING APPLICATION DATA

The present application is a continuation-in-part of my prior filed U.S. patent application Ser. No. 803,035, filed Dec. 6, 1991, now U.S. Pat. No. 5,287,789.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND OF THE INVENTION

This invention generally relates to a teaching device to assist music students in recognizing and producing accurate pitch, timbre (tonal quality), and timing (meter) on their musical instrument and more particularly to an electronic apparatus to quantify and provide visual feedback of the musical performance of a student to that of a musical reference.

DESCRIPTION OF THE PRIOR ART

Definitions

A student of music, for purposes of description, is anyone who is trying to play a musical instrument. The invention disclosed herewithin discusses musical instruments that produce a tone of detectable pitch. This includes the human voice, violin, and flute and excludes most percussive instruments (e.g. snare drum and tambourine). A tone has aural parameters that include pitch, amplitude, duration, and timbre. When used in the context of 'audible tone reference', tone can include any combination of pitched and unpitched sound sources (e.g. a band with a percussion section).

Prior Art

A basic ability required of a student of music is to produce and sustain a musical tone of defined pitch and good timbre. This task is easy on an instrument like a piano which mechanically quantizes pitch and constrains timbre. A singer, however, must dynamically adjust their vocal muscles to control pitch and timbre based on their aural perceptions. Similarly, a violinist must adjust their bowing and fingering based on their aural perceptions.

The importance of these aural perceptions is demonstrated in the difficulty deaf children have learning to speak. If the internal discernment of pitch and timbre is not developed in an individual, some external feedback is necessary. In their paper titled "Computer-Aided Speech Training for the Deaf" (Journal of Speech and Hearing Disorders February 1976 Vol. 41, No. 1) R. S. Nickerson, D. N. Kalikow, and K. N. Steven report on a computer-based system that uses visual displays of speech parameters (e.g. pitch, amplitude, and spectrum) to aid speech training for the deaf.

In music instruction, a student's aural perceptions are typically developed through collaboration with a music teacher who points out, by verbal comment and audible example, the pitch, timbrai, and timing errors of the student. Teaching musical skills are complicated by the fact that sound, unlike paintings, cannot directly be seen and only exist when played. Audio tape recorders allow a student to review their performance, but do not provide any analysis.

A system of entertainment that offers learn-by-example instruction is the karaoke system popularized in Japan. A karaoke system (literally Japanese for 'hollow orchestra') consists of a pre-recorded audio source, a microphone, audio mixer, amplifier, and speaker. The audio source material, typically a compact or laser disk (LaserKaraoke (R) Pioneer LDCA. Inc. 2265 East 22th Street Long Beach, Calif. 90810), is specially prepared with musical accompaniment on one channel and a solo vocal reference on the other. The musical accompaniment can be any musical instruments that provide tonal support for the singer. The accompaniment is usually a band or orchestra but could simply be a piano, other vocalists, or a guitar. The reference channel is typically the solo voice of a trained singer, or a solo instrument like a clarinet or monophonic synthesizer. The karaoke system allows the singer to independently adjust the volume of their voice, the accompaniment, and the reference solo voice. Typically a student would practice singing with the reference solo voice and accompaniment. After they have learned the words and are comfortable singing the melody, they turn off the reference solo voice and sing, unassisted, with the accompaniment. More elaborate karaoke systems use a laser disk or CD+G compact disk (a format that encodes graphic images with audio) that display song lyrics on a video monitor which change color as each word is sung (analogous to "the bouncing ball" technique). Karaoke systems do not evaluate the singer's performance and hence the student must rely on their own musical perceptions for guidance.

Electronic devices exist which visually indicate the instantaneous absolute pitch and error of a tone source (e.g. Sabine ST-1000 Chromatic Auto Tuner, Korg DT-2 Digital Tuner, Arion HU 8400 Chromatic Tuner). Mercer (U.S. Pat. No. 4,273,023) discloses a device that displays the instantaneous absolute pitch of a musical instrument with an array of led's arranged on a musical staff but can only display the pitch of one tone source at a time. Tumblin (U.S. Pat. No. 4,321,853) discloses a system that measures the instantaneous pitch of a musical instrument relative to an electronically generated reference tone and displays the difference (the pitch error) on a column of lights. Neither of these systems provide a time history of pitch nor do they provide any quantative indication of timbre or amplitude.

The system of Nickerson, et. al. displays a time history of pitch, duration, and timbre but is not well suited for musical instruction. The system uses a miniature accelerometer applied to the throat with adhesive tape to measure the pitch of the student's voice. Since the student's are deaf, no consideration for aural reference is made. Data collected is presented in the context of speech, not music, and no provisions are made for pitch tracking musical instruments.

Producing an accurate static tone is a good start for a music student, however music is the dynamic organization of sound over time. An accomplished musician needs addition skills to produce a sequence of tones (playing a melody), match a sequence of tones (playing a melody in key), produce a tone relative to a reference tone (playing an interval), produce a sequence of tones relative to a sequence of reference tones (playing in harmony), produce tones in a broad range of pitches (range), quickly varying the pitch and amplitude (vibrato and tremolo), produce tones at specific times and durations (playing in meter), and produce tones of good timbre (tone quality).

Neither Mercer or Tumblin have the display necessary to show a time history. Mercer has two pitch trackers but lacks any memory means to store the pitch data. Tumblin has music exercise data stored but only has one pitch tracker and does not store the pitch data. Tumblin uses music exercise data that must be specifically prepared for his invention. This requires the production, marketing, and distribution of music exercise data.

Pitch tracking is the dynamic determination of the fundamental frequency of an applied audio signal. Much work has been done developing the art of pitch tracking for speech recognition. Niedzwiecki and Mikiel (1976) (Hess, Wolfgang "Pitch Determination of Speech Signals" Volume 3 of Springer Series in Information Sciences, Springer-Verlag New York, page 175) report of a pitch tracker using a tunable low-pass filter whose cutoff is dynamically adjusted by the amplitude of the output signal. If a signal is present at the output, the cutoff frequency is lowered until the amplitude of the output goes down. Ideally the adaptive operation of this system would dynamically maintain the cutoff frequency of the filter slightly above the fundamental frequency of the applied audio signal. In addition to the reported problem of tracking performance being dependent on input signal level, I have found through experiment that the output signal may produce noisy tracking results due to its small signal to noise ratio.

The systems of Mercer and Tumblin rely on pitch trackers that require one and only one peak per pitch cycle and an amplitude envelope that does not fluctuate rapidly. For example, when upper harmonics (overtones) of a resonant low-pitched male voice are reinforced as they fall within the frequency range of formants (the natural resonance frequencies of the vocal track), multiple peaks can occur.

A musically trained listener can detect pitch errors as small as 0.3%, a deviation of about one cycle per second for an A4 (440 Hz). The accuracy and stability of a pitch tracker is therefore very important in a music training system.

Timbre refers to the tonal quality of a musical instrument, the combinations of overtones that give each instrument its unique sound. The 'nasal' quality of a voice and the 'scratchy' sound of a violin are all references to timbre. Fourier analysis is one technique to quantify timbre by measuring the energy in the component frequencies of a sound source. The analysis, however, requires numerous computations and is time consuming. Nickerson, et. al. use a bank of 19 filters to determine spectral content of the deaf student's voice. An analog electronic implementation of such a filter bank would require many parts that occupy circuit board space, undesirable in a portable unit, and would have an impact on manufacturing time and cost. A digital implementation would require signal processing capabilities with associated speed requirements and cost. Both approaches produce an abundance of data that must be further processed in order to be interpreted. A preferred analysis technique would require few components, have a low cost, and produce a results that was easy to interpret.

MOTIVATION FOR A DIGITAL PITCH TRACKER

It would be an advantage to have a music training apparatus which included a pitch tracker that could be efficiently implemented in software using pre-existing sound sampling hardware. Such an apparatus could be provided as software and operate on pre-existing hardware, eliminating the cost and complexity for the consumer to buy and install additional hardware, and relieve the manufacture of the costs and development time to produce hardware.

REQUIREMENTS OF A DIGITAL PITCH TRACKER

The task of pitch tracking using the existing digitizing hardware is difficult, useful and non-obvious. The pitch tracker for a music training apparatus must satisfy the conditions of running in "real time" (i.e.. substantially simultaneous to the user's production of sound), be user independent operating reliably and accurately for a variety of voice, over a wide range of pitches and timbre) use the data produced by the pre-existing hardware, and use minimal computational time and memory resources of the host computer to allow the operation of computer graphics and processing required by the application program (e.g.,. music instruction and animation responsive to the user's vocalization).

PRIOR ART REGARDING DIGITAL TRACKER

The sound digitizers typically sample sound anywhere from 8,000 to 40,000 samples per second with an amplitude resolution of 8 bits. Traditional frequency-domain pitch tracking techniques (e.g. Fourier analysis) do not meet the restrictive computation time requirements since they are computationally intensive, involving numerous calculations including multiplications which for many computers must be carried out by several instruction. Traditional time-domain methods either require some pre-processing (e.g. filtering) to make the digitized waveforms easier to track, or do not operate consistently well for a variety of timbres. As cited in the references of the parent application, particularly those of Hal Chamberlin and Wolfgang Hess, each time-domain pitch detection method fails with a particular class of waveforms.

It is helpful for a student of music to see several notes in advance in order to plan playing technique necessary to shape musical phrases. None of the musical system mentioned display tones in advance of being heard.

Of the numerous musical instruments a student might want to learn, singing is often the most psychologically difficult for those adults who were told as children that they could not sing. These adults are often reluctant to attempt singing in front of others for fear of judgement. Singing is a skill, like reading, that needs to be developed by instruction and practice. Individual instruction is often necessary, for each student's errors and progress are unique. Typically vocal instruction requires finding a music teacher, arranging a visitation schedule, paying for the classes, and maintaining regular attendance. These factors can discourage potential music students from pursuing instruction. An ideal music instructor would be available anytime, anywhere, would have infinite patience, be consistently accurate, non-judgmental, could be shared among several people for no additional cost, provide instruction on any of a thousand popular songs, show exactly where student's errors are, and comply to the interests and pace of each individual student.

It can be seen, therefore, that a need exists for a music training apparatus that can provide a student with an accurate temporal visual record of aural parameters of their musical performance and of a musical reference.

SUMMARY OF THE INVENTION

A principal object of the invention is to provide training, assistance, and guidance to music students in the development of musical skills.

Another object of the invention is to allow music students to visually monitor temporal representations of musical parameters of their musical performance and a musical reference.

A further object of the invention is to be compatible with a wide range of musical reference sources.

Another object of the invention is to provide a pitch tracker capable of determining the pitch of a wide range of monophonic audio inputs.

Another object of the invention is to provide a simple and inexpensive means to measure the timbre of an audio signal.

Another object of the invention is to provide a means to practice intonating interval, assisted by a temporal history of visual representations of aural parameters.

A further object of the invention is to provide a means to practice intonating melodies, assisted by a temporal history of visual representations of aural parameters.

In order to accomplish these objectives, the invention comprises a means to provide a monophonic reference source, a means to objectively and accurately quantify the aural parameters of pitch, duration, amplitude, and timbre of student intonations and that of the monophonic reference source, a means for digitally storing said parameters, a means for visually representing a temporal history of said parameters, a means for providing reference aural parameters, a means for determining and visually representing musical intervals of the monophonic reference source, a means for digitally recording and playing back an audio signal, a means for providing audible tone reference, and a means for providing musical instruction.

A monophonic reference source is the musical performance the student is striving to emulate. The performance may be as simple as matching a single pitch, singing intervals to a pitch, or as complex as singing an entire opera. The monophonic reference source contains a sequence of one or more aural parameter which include pitch, timbre, amplitude, and duration. Monophonic reference sources include a live or recorded series of tones produced by such sources as a human voice, musical instrument, or electronic device. The monophonic reference source need not be audible. The sequence of aural parameters (a "note event list") may be provided as data organized on media such as magnetic disk, tape, or computer memory. A note event list is a chronological record of pitch and duration of a musical performance. A piano roll is an example of a note list recorded on paper. Note lists can also be created by playing on a synthesizer and having a computer record the key strikes ("note events"). Libraries of popular and classical songs stored as note event lists are commercially available (e.g. Music Productions, Inc. P.O. Box 22681 Milwaukee OR 97222-0681 or Passport 625 Miramontes Street, Half Moon Bay, Calif. 94019). Commercial note event lists are commonly arranged as orchestrated pieces of music with several parts ("tracks") occurring simultaneously. Such note event lists are used as monophonic reference sources by designating one track as the melody and the rest as accompaniment. This designation can either be ascertained from the manufacture, or discovered by trial. Once designated, the host computer 13 can retain this information to relieve the student of any further concern over track designation. The means of reading a note event list with a computer and sending note event commands to a synthesizer have become greatly simplified with the adoption of the MIDI (Musical Instrument Digital Interface) standard, is well to those skilled in the art, and need not be covered here.

Student intonations are monophonic tones produced or caused by the actions of the student, including singing and playing a musical instrument. Student intonations are received and converted by a pickup device, such as a microphone or electromagnet, into an electric signal applied to the invention.

The pitch of a monophonic tone source is determined by a pitch tracker. In one embodiment of the invention the upper harmonics of a tone source are attenuated by a tunable low-pass filter and applied to a zero cross detector. Also, an improved digital version is provided. The cutoff frequency of the low-pass filter is dynamically determined by analyzing features of the output waveform of the low-pass filter. The pitch durations of the tone source may be determined by detecting abrupt changes in the frequency, amplitude, and/or spectrum of the tone source. In a preferred embodiment, a fixed amplitude threshold is used to detect duration, an envelope follower is used to detect amplitude, and counting the number of times the slope of the tone's waveform changes sign is used to determine timbre. Said means to detect pitch, amplitude, duration, and timbre are used in a preferred embodiment to determine the aural parameters of student intonations and that of audible monophonic reference sources.

The absolute pitch of a musical interval is based on a musical scale built on a reference pitch ("tonic"). In a preferred embodiment the tonic is provided by the monophonic reference source. Intervals may be visually represented in many forms. In one embodiment intervals appear as horizontal lines, vertically positioned by pitch.

In one embodiment, aural parameters of student intonations are digitally stored in random access memory (RAM) by the operation of a microcontroller unit (MCU). Aural parameters from one or more sources may be visually represented in a variety of ways. One embodiment visually represents aural parameters on a graphic display with pitch plotted in logarithmic units along the vertical axis and time in linear units along the horizontal axis. Each source of aural parameters is represented by a line of unique brightness whose thickness represents amplitude and color represents timbre.

The means to record and playback audio signals digitally are well known to those skilled in the art (see Chamberlin, Hal "Musical Applications of Microprocessors" 1980 Hayden Book Company, Inc. Rochelle Park, N.J., chapter 12). In one embodiment the tone source is low-pass filtered to prevent aliasing and sampled at regular intervals with an analog-to-digital converter (ADC). The digital samples are stored in RAM and played back through a digital-to-analog converter (DAC) followed by a low-pass filter to remove sampling artifacts.

The audible tone reference provides a guide to assist the student in their musical performance and may be a sequence of singular tones ("monophonic") or a plurality of tones ("polyphonic"). Sources of audible tone reference include live and recorded human voices, musical instruments, and electronic tone generators. The audible tone reference can be as simple as a solo human voice, or as complex as a full orchestra. The monophonic reference source may serve as the audible tone reference. If the monophonic reference is inaudible (as with a note event list) a means such as an electronic tone generator may be used to express the tone of the aural parameters.

Several firms (e.g. Pocket Songs 50 S. Buckhout Street Irvington, N.Y. 10533, SongTrax (tm) by Songtech 3900 E. Whiteside Street. Los Angeles, Calif. 90063) provide prerecorded popular music in a format ("multiplexed format") that separates a solo instrumental performance from an accompaniment (as in the karaoke system). Typically a stereo tape recording is provided with a solo vocal performance on the right channel and a band playing accompaniment on the left channel. This multiplexed format can provide both the audible tone reference and monophonic reference source. In one embodiment of the invention the solo vocal channel is used as the monophonic reference source, and the combination (audio mix) of both channels is used as the audible tone reference.

The means for providing musical instruction may be any recorded material that guides the student. This may include written material (e.g. a text or workbook), text and/or graphics on a visual display, audible material on a compact disk, vinyl record, or audio tape, and material digitally stored in RAM, ROM, optical disk, or magnetic media. For example the recorded material may guide the student by providing an audio reference of a properly played instrument (e.g. a karaoke recording) or by providing a syllabus of instruction on applied music theory (e.g. a lecture on scales and intervals with musical examples).

In a preferred embodiment of the music training system, an audio tape recording of a vocal instructor provides both the source of musical reference and musical instruction. The audio tape contains vocal exercises that are used with the invention to practice such exercises as holding a steady tone, singing in meter (proper rhythm ), singing a melody, and singing harmonies. The audio tape contains verbal descriptions of each exercise, intonations by the instructor, complete songs with vocal and musical accompaniment, and encoded commands to automatically control functions of the invention. The display screen simultaneously shows a temporal visual representation of aural parameters of the student and the instructor. A preferred visual representation of tone sources are graphic plots where the vertical axis is pitch (in logarithmic units), horizontal axis is time, line thickness is amplitude, line color is timbre, and line brightness is used to distinguish multiple tone source.

In a preferred embodiment instruction in singing intervals and harmonies is provided by displaying musically related pitches (e.g. third, fifth, and octave) to a reference pitch from the monophonic reference source. The display speed can be increased to disclose precise pitch contour, revealing such features as vibrato, pitch sustaining accuracy, and note approach (e.g. overshoot or undershoot).

DESCRIPTION OF THE PREFERRED EMBODIMENTS

For purposes of explanation and simplicity the invention will be described in the context of voice instruction using the intonations and speaking voice of a pre-recorded vocal instructor as the monophonic reference source, audible reference, and musical instruction. Other sources of musical reference and instruction may be used without deviating from the spirit of the invention.

Figure 1:
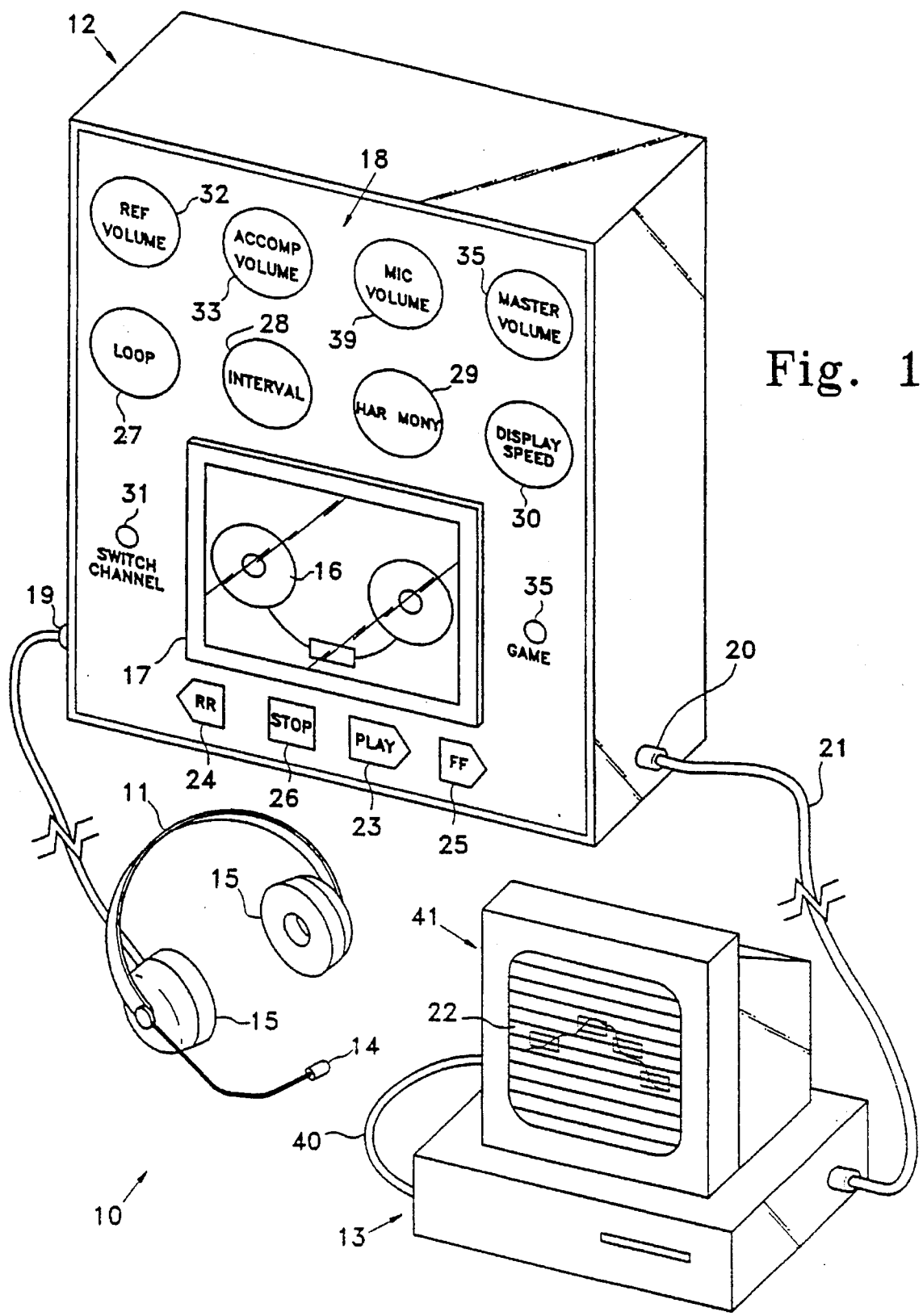
FIG. 1 shows a perspective view of the invention illustrating the basic system components.

A perspective view of the invention 10 can be seen as set forth in FIG. 1. The four main components are: a) a headset 11, b) a control unit 12, c) a host computer 13, and d) a video monitor 41. The headset 11 contains a microphone 14 to pick up student intonations and headphones 15 for the student to monitor their voice and recorded material. The control unit 12 contains an instructional audio tape 16, a stereo audio tape player 17, various control switches 18, a connector 19 for the headset 11, and a serial communication output 20. The control unit 12 sends aural parameters to the host computer 13 over the serial communication line 21. The host computer 13 receives aural parameters and generates a video signal 40 that contains a visual representation of the aural parameters. The video signal 40 is sent to a video monitor 41 and viewed on the display screen 22. The host computer 13 is used as a display driver for the video monitor 41 to decrease the cost of the invention 10 for someone who already has a computer (e.g. an IBM PC or Apple Macintosh). However it is not required and both the host computer 13 and video monitor 41 may be replaced with a portable display (e.g. a liquid crystal) and appropriate control electronics to make a compact, battery powered, portable version of the invention.

The headphones 15 prevent sound from the audible tonal reference and accompaniment source from reaching the microphone 14, which would otherwise add additional frequencies and noise that could result in pitch tracking errors. Extraneous noise from the environment can be reduced by using a directional-type microphone.

The stereo audio tape 16 contains two channels, a) the accompaniment channel which contains verbal instructions for the student and musical accompaniment (e.g. a piano) and b) the monophonic reference channel which contains intonations of the vocal instructor and encoded commands to control functions of the invention.

In order to understand some of the functions of the invention, some musical terms must be introduced. A tone is an audible sound that has pitch, timbre, duration, and amplitude. An interval is the frequency relationship between two pitches. A scale is a series of pitches that are related by specific intervals. A note is any pitch of a scale. The key is the first note of a scale. A harmony is two notes played together. A melody is a sequence of notes. A harmonic melody is a sequence of harmonies. A common scale in Western music is the major scale which contains 7 pitches. A chromatic scale is a sequence of 12 pitches based on the interval the twelfth root of two. A pitch that is not equal to any note of a scale is called an accidental. If the pitch is not exactly equal to any note of the chromatic scale, it is considered out of tune and is described as being sharp or flat (higher or lower in frequency) relative to the nearest note of the chromatic scale. The first note of the scale is the key, also referred to as the "tonic". Three common intervals are the third, fifth, and eighth. These refer to the third, fifth, and eighth note of the scale. The eighth note is an octave interval, twice the frequency of the tonic. The pitch of the tonic must be known in order to determine an interval. Since intervals are ratios, musical calculations are best done in logarithmic units. Logarithmic units of pitch are semitone and cents (hundredths of a semitone). A semitone is the interval the twelfth root of two. There are twelve semitones per octave. Each semitone is the pitch of a note of the chromatic scale. An interval is determined by calculating a chromatic scale based on the tonic pitch and adding the number of semitones that correspond to the desired interval. For example 4 semitones are added for major third interval, 7 semitones are added for a perfect fifth interval.

At all times, whenever the student sings, the student hears their voice on the headphones 15 and sees a temporal visual representation of their voice's aural parameters on the display screen 22. The control unit 12 contains various switches 18 that, when pressed, perform the following functions;

PLAY 23. The audio tape 16 plays. Student hears recorded material from audio tape 16 along with their voice on the headphones 15. Student sees a visual representation of aural parameters of their voice and the monophonic reference channel on the display screen 22.

REWIND 24. Rewinds audio tape 16 to review past material.

FAST FORWARD 25. Advances audio tape 16 to new material.

LOOP 27. Stops audio tape 16. Student hears the most recent history of the instructor's intonation, digitally replayed in an endless loop, and sees aural parameters of student's and instructor's intonations on the display screen 22. Alternate presses terminates the LOOP function. STOP 26. The audio tape 16 stops. The LOOP function (if on) stops. SHOW INTERVALS 28. Musical intervals (e.g. third, fifth, octave) related to a tonic are visually represented on display screen 22. When the SHOW INTERVALS switch 28 is pressed, the current pitch of the monophonic reference source is saved and used as the tonic. If no pitch is present on the monophonic reference channel when the SHOW INTERVALS switch 28 is pressed, the previously stored tonic is used. Successive presses of the SHOW INTERVALS switch 28 toggle the function on and off.

SHOW HARMONY 29. Harmony pitches are displayed (e.g. third, fifth, and octave) for each monophonic reference pitch. The tonic is determined by the same technique used in SHOW INTERVALS. Successive presses of the SHOW HARMONY switch 29 toggle this function on and off.

DISPLAY SPEED 30 changes the time (horizontal) scale of the display screen 22. A fast display speed reveals details of pitch trajectory, for example vibrato depth and speed, pitch stability, and reference pitch approach. A slower display allows more pitches to be displayed on the display screen 22.

SWITCH CHANNEL 31. This switch reverses the output of the stereo tape player 17. This function allows either channel of a stereo audio tape 16 to be treated as the monophonic reference source.

REFERENCE VOLUME 32. This control varies the volume of the monophonic reference channel heard on the headphones 15.

ACCOMPANIMENT VOLUME 33. This control varies the volume of the accompaniment channel of the tape player 17 heard on the headphones 15.

MIC VOLUME 39. This control varies the volume of the student's voice heard on the headphones 15.

MASTER VOLUME 35. This control varies the combined volume of all audio signals applied to the headphones 15.

The particular intervals and harmony, or alternative scales (e.g. pentatonic or other non-Western scales) can be preset, selected by encoded tone on the monophonic reference channel, or manually set by additional switches (not shown). In some cases it might be difficult to set the tonic as described, as in the case of pre-recorded songs. The tonic may also be set by manual switches (not show). For example two switches could respectively increment and decrement the tonal pitch in semitone increments and the selected tonic (e.g. C#) could be viewed on the display screen 22.

Further controls may be provided to tune and transpose the audible tone reference when provided by a tone generator under control of the invention.

Figure 2:
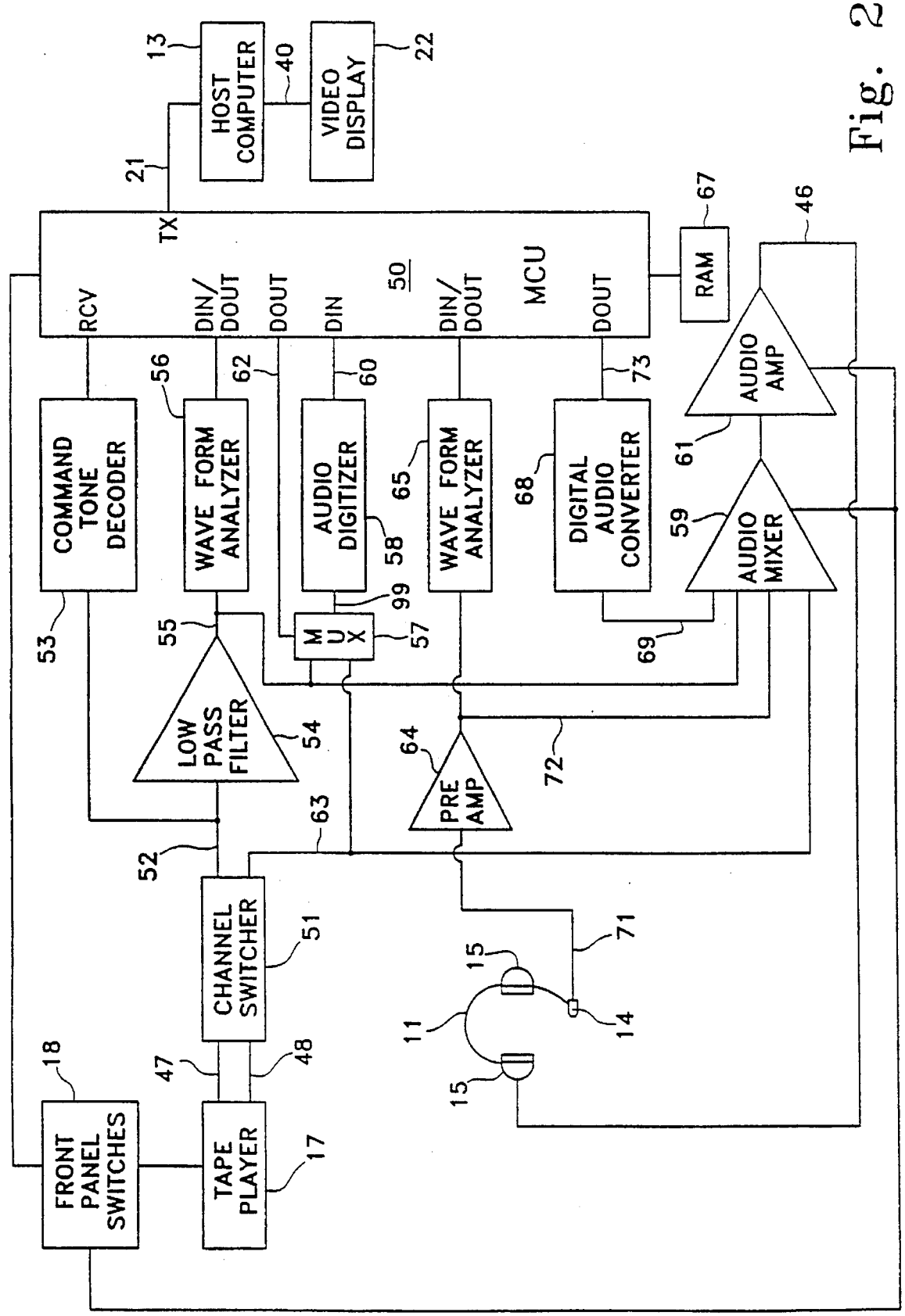
FIG. 2 illustrates schematically, by means of a simplified block diagram, the electronic components of the present invention.

A simplified block diagram of the control unit 12 is set forth in FIG. 2. A microcontroller unit 50 (MCU) (68HC11-Family Microcontroller, Motorola Inc. Microcontroller Division Austin, Tex. 78735) is used to perform much of the control functions of the invention 10. Although this microcontroller with it's built in analog-to-digital converter (ADC), electrically erasable read only memory (EEPROM), random access memory (RAM), read only memory (ROM), serial communication interface (SCI), 16-bit timer and pulse accumulation circuit (PAC), provide for a highly integrated, small, inexpensive, and low power implementation of the invention 10, it is not required and may be replaced with other electronic circuitry or software. For simplicity, however, the invention will be described using the MCU 50 as the controlling device.

The function of many of the pins on the 68HC11 are software configurable so their designated names do not always disclose their function. For clarity, pins on the MCU 50 have been renamed according to their function as follows; DIN=data in, DOUT=data out, ADC=analog-to-digital converter, RCV=serial in, TX=serial out, capture timer input, PAI=pulse accumulator input.

The audio lines 47 and 48 from the output of the audio tape player 17 are routed through the channel switcher 51, a double-pole single-throw switch set by the control SWITCH CHANNEL 31. This allows either output line 47 or 48 of the audio tape player 17 to be treated as the monophonic reference signal 52, and the alternate as the accompaniment signal 63.

The monophonic reference signal 52 is applied to the command tone decoder 53 which detects the presence of a high frequency marker tone (e.g. 10 kHz) used to encode commands in the monophonic reference signal 52. A low-pass filter 54 removes the marker tone from the rest of the audio path 55. The filtered monophonic reference signal 55 is applied to the waveform analyzer 56, the multiplexer 57, and the audio mixer 59. The waveform analyzer 56 extracts the aural parameters pitch, amplitude, duration, and timbre. The audio digitizer 58 converts the continuous audio signal 59 into digital samples 60. The multiplexer 57 selects the audio signal (55 or 63) to be digitized, typically the monophonic reference signal. The audio mixer 59 combines the monophonic reference signal 55 with other audio signals, the sum of which are amplified by the audio amplifier 61 and heard on the headphones 15.

The multiplexer 57 is normally set by the MCU's 50 control line 62 to select the monophonic reference signal 55 as the source to be digitized. The audio tape 16 can instruct the MCU 50, through a tone encoded command detected by the command tone decoder 53, to set the multiplexer 57, through control line 62, to select the accompaniment signal 63 as the source to be digitized. The multiplexer 57 may also be set manually, for example by switch (not shown). There are cases when the multiplexer 57 would be set to digitize the accompaniment signal 63, such as when the monophonic reference signal 55 contains the reference aural parameters but not the audible tone reference. In one embodiment the monophonic reference source is a recording of tones of steady pitch and constant timbre and amplitude (e.g. from a synthesizer) which produce correspondingly consistent visual representations used as a model of an idealized singer. The monophonic reference pitches would sound irritating (i.e. "machine-like") due to their aural consistency so an audible tone reference of a person singing is provided on the accompaniment channel. The two channels are synchronized so that each tone occurring on the monophonic reference channel corresponds to a tone on the accompaniment channel.

The microphone 14 converts the voice of the student into an electric signal 71 that is amplified by the audio pre-amplifier 64 and applied to the waveform analyzer 65 and the audio mixer 59. The waveform analyzer 65 is identical to waveform analyzer 56. The gain of the audio pre-amplifier 64 may be adjusted by the student (not shown) to compensate for variations in microphone 14 sensitivities and strength of the student's intonations. An indicator lamp (not shown) may be included to indicate when gain of the audio pre-amplifier 64 was too high (i.e. the amplifier has reached its maximum output and is distorting).

The MCU 50 decodes commands from the tape player 17 by monitoring the output of the command tone decoder 53. The MCU 50 also receives commands from the front panel control switches 18.

The MCU 50 saves the most recent samples of digitized audio (e.g. the last 8 seconds worth) from the audio digitizer 58 in RAM 67. The most recent samples of aural parameters from the waveform analyzers 56 and 65 are saved in the host computer 13. When the LOOP switch 27 is pressed by the student, the MCU 50 stops the audio tape player 17 and sends the last several seconds of digitized audio samples, in a continuous endless loop, to the DAC 68. The DAC 68 converts the digital signals 73 into an audio signal 69 that is mixed with the voice of the student 72 by the audio mixer 59, amplified by the audio amplifier 61, and heard on the student's headphones 15. For simplicity the combined audio signal 46 is considered a monophonic sum of all the audio signals applied to the audio mixer 59, and heard equally on each headphone 15 of the headset 11. It is understood that additional controls commonly occurring on audio mixers, would provide a stereo output with individual spacial placement (pan or balance control) for each of the audio inputs to the audio mixer 59.

The MCU 50 continually reads and controls the waveform analyzers 56 and 65. The MCU 50 processes the output of the waveform analyzers 56 and 65 and sends quantized values of aural parameters to the host computer 13 through display commands and data, sent over the serial communication line 66. The host computer 13 runs a display program that converts display commands and data into visual representations and outputs a video signal 40 to the display screen 22. A partial list of representative display commands with description and data (if any) are set forth in Table 1, below.

TABLE 1

| Command | Description | Data |
| --- | --- | --- |
| DRAW TONE | Plots aural parameters | aural parameter source, pitch, amplitude, time stamp |
| LOOP | Activates loop function | |
| CLEAR SCREEN | Clears the screen | |
| SHOW STAFF | Draws musical staff | |
| SET SPEED | Sets speed of display | |
| SHOW MAZE | Draws maze | |
| SHOW INTERVAL | Plots interval bars | aural parameter source, tonic |
| SHOW HARMONY | Plots harmony bar | aural parameter source, tonic |
| LOOP IN MARKER | Loop begin time | time stamp |
| LOOP OUT MARKER | Loop end time | time stamp |

Several commands specify the aural parameter source since the invention can analyze and display aural parameters of multiple sources (e.g. student intonation and monophonic reference source). The DRAW TONE command contains a time stamp which specifies the absolute time of aural parameter occurrence. The host computer 13 uses the time stamp to locate the position (X axis) of aural parameters on the display screen 22. The time stamp is derived from a system time clock maintained by the MCU 50. The aural parameter duration is not sent in the DRAW TONE command for it is apparent in the temporal nature of the display screen 22 (i.e. the duration of an aural parameter is seen as its horizontal length). The SHOW INTERVAL and SHOW HARMONY commands specify the tonic of the scale to be used for calculating interval and harmony pitches.

The LOOP function plays out a digital recording of sampled audio visually represented on the display screen 22. In the preferred embodiment the last several seconds of audio material are saved by the MCU 50 in RAM 67 and the most recent segment of monophonic reference aural parameters are stored in the host computer 13. The LOOP command instructs the host computer 13 to maintain the temporal display of the most recent segment ("looping segment") of monophonic reference aural parameters and update student aural parameters, while the MCU 50 plays back the last several seconds of audio material. The result is the student sees and hears an unchanging segment of the most recent history of the monophonic reference source repeated endlessly along with an updating display sweep of his intonations. The time duration of the looping segment ("looping time") is dependent on the display speed-the faster the display speed, the shorter the looping time. The looping time and the corresponding monophonic note events included in the looping segment is specified by the LOOP IN MARKER and LOOP OUT MARKER. The loop in time specifies where in the monophonic reference note event list the looping segment begins, and the loop out time specifies where the looping segment ends. When the LOOP switch 27 is pressed the loop in time is set to the system clock. The display period is the time it takes to aural parameter data to scroll completely across the screen. The loop out time is calculate as the loop in time minus the display period. The loop in and loop out times are sent to the host computer by the LOOP IN MARKER and LOOP OUT MARKER commands respectively. These times may be adjusted to allow a particular section of the looping segment to be repeated. The loop in and loop out times may be independently and continuously adjusted, for example, by two slide potentiometers (not shown) read by two of the MCU 50 analog-to-digital ports, or adjusted in increments of monophonic reference note events by push buttons.

A note event list is a complete record of every note with its associated aural parameters occurring in a piece of music. One feature of the invention is the display of aural parameters of notes in advance of student intonation. Looking ahead in a musical score at upcoming notes, allows a musician to phrase a series of note (e.g. build up volume to a crescendo), identify rhythmic patters, view lyrics (as can be coded in a note event list), and otherwise prepare their instrument (e.g. breathing for a vocalist, placing a bow for a violinist).

Figure 3:
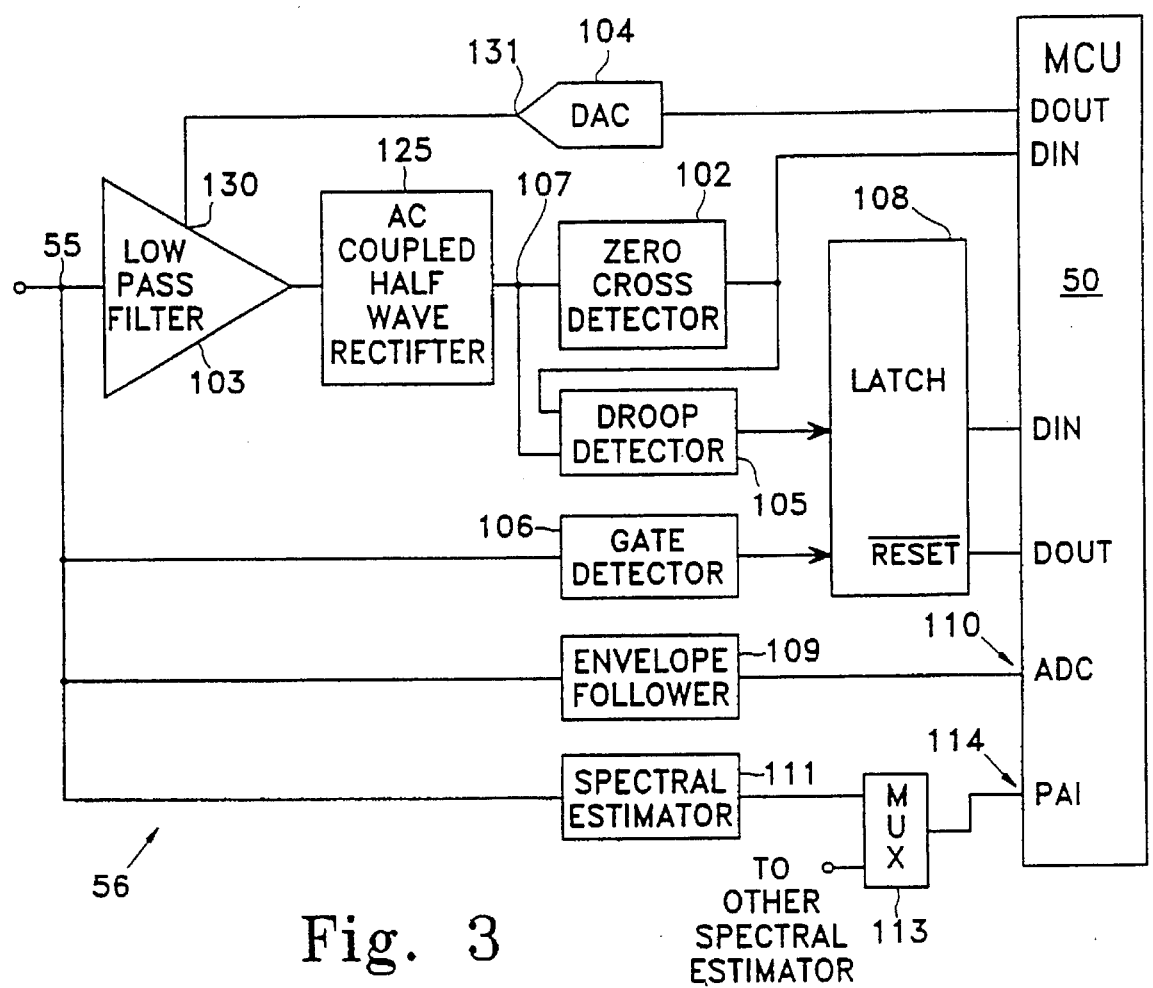
FIG. 3 illustrates schematically, by means of a simplified block diagram, the waveform analyzer.

The block diagram of electronic circuitry as set forth in FIG. 3, details the waveform analyzer 56 which quantifies the aural parameters of pitch, amplitude, duration, and timbre of the applied audio signal 55. The waveform analyzers 56 and 65 are identical and differ only in the signals that enter and leave them. Therefore only waveform analyzer 56 will be examined.

The pitch of the applied audio signal 55 is determined by measuring the period of its fundamental frequency. The period is detected by the zero cross detector 102. The fundamental frequency is extracted from the audio source 55 by the tunable low-pass filter 103. The cutoff frequency of the tunable low-pass filter 103 is determined by the control input 130 voltage set by the digital-to-analog converter 104 (DAC). The MCU 50 adjusts the DAC 104 voltage output 131 based on the output of the droop detector 105 and the gate detector 106. The droop detector 105 indicates the amplitude and tendency of the applied waveform 107 to make more than two zero crossings during a pitch cycle, which would result in a pitch tracking error. The gate detector 106 indicates when the amplitude of the applied audio signal 55 exceeds a fixed threshold. The latch 108 stores the momentary output of the droop detector 105 and gate detector 106 and is read and reset by the MCU 50.

The envelope follower 109 tracks the amplitude of the applied audio signal 55 and is read by an ADC input 110 of the MCU 50. The spectral estimator 111 detects changes in the slope of the waveform of the applied audio signal 55. The output of the spectral estimator 111 is counted by the pulse accumulator input 114 (PAI) of the MCU 50.

Different configurations of the invention 10 may be formed based on the selection of storage technique, monophonic reference source and audible tone reference. Several embodiments are presented as set forth in Table 2, below.

TABLE 2

| CON-FIG. TONE | STOR-AGE MEDIA | MONO-PHONIC REFER-ENCE | WAVE-FORM ANALY-ZER | AUDIBLE REFER-ENCE |
| --- | --- | --- | --- | --- |
| 1 | audio tape | note events (R) | NO | solo + band (L) |
| 2 | audio tape | solo vocal (R) | YES | solo (R) + |

TABLE 2-continued

| CON-FIG. TONE | STOR-AGE MEDIA | MONO-PHONIC REFER-ENCE | WAVE-FORM ANALY-ZER | AUDIBLE REFER-ENCE |
| --- | --- | --- | --- | --- |
| | | | | band (L) |
| 3 | audio tape | pure tone (R) | YES | solo + band (L) |
| 4 | none | teacher | YES | teacher |
| 5 | floppy disk | note event list | NO | synthesizer |

Nomenclature:
(R) = right channel of audio tape source
(L) = left channel of audio tape source All these configurations use a waveform analyzer 65 to extract aural parameters from student intonations. The heading CONFIG. refers to the configuration embodiment. The heading STORAGE MEDIA refers an example of media on which the information (e.g. monophonic and audible tone reference) can be stored. Audio tape can be replaced with any media capable of storing two channels of audio (e.g.L.P., compact disk, D.A.T., laser disk). Floppy disk can be replaced with any media that can store digital information (e.g. RAM, ROM, optical disk, hard disk). The heading MONOPHONIC REFERENCE refers to the source of the monophonic reference. The symbols (R) and (L) refer to the right and left channel of the audio tape. These assignments are arbitrary and are used to indicate channel allocation. The heading WAVEFORM ANALYZER indicates if the configuration requires a second waveform analyzer 56 to extract aural parameters from the monophonic reference. The heading AUDIBLE TONE REFERENCE indicates the source of the audible tones the student hears as a tonal guide.

In case 1 tone encoded note events are stored on the right channel of an audio tape. An audio mix of solo vocal and accompanying band is provided on the left channel to guide the student. Case 2 may be used with commercially available music recorded in the multiplexed format. Reference aural parameters are extracted from the solo vocal performance and the student monitors both the solo vocal and accompanying band for a tonal reference. The configuration of case 3 records a pure tone with steady pitch, constant timbre and amplitude on the right channel and a combination (audio mix) of solo vocal and accompanying band on the left channel. This configuration produces a visual representation of an ideal performance. The pure tone is typically annoying to listen to due to its lusterless consistent nature, so the left channel provides the a mix of solo vocal and band as a tonal guide to the student. Case 4 uses a live musical instructor playing along with the student. For example a singing teacher would sing along with the vocal student. The teacher and student each require a waveform analyzer; 56 and 65 respectively, and a headset 11. In case 5 the monophonic reference source is a note event list of aural parameters digitally stored on a floppy disk. Since the monophonic reference source is inaudible, note events are sent by the MCU 50 or host computer 13 to a synthesizer (not shown) which provides the audible tone reference.

When note events are used as the monophonic reference source, the displayed aural parameters of the monophonic reference source can lead, lag, or be in unison to the audible tone reference. Typically it is desirable to have the visual display of reference aural parameters lead the audible tone reference so the student can look ahead to upcoming notes. For the case of a digitally stored note event list (case 5 of Table 2), one software implementation would have two pointers reading out of the note event list. One pointer would select note events to be displayed, the other pointer would select note events to send to the synthesizer. The offset of these two pointers would determine how far ahead the display was from synthesizer intonations. For the case of note events tone encoded on an audio tape (case 1 of Table 2), one implementation would have the audio tape prepared with the tone encoded note events leading the audible tone events. The host computer 13 could be informed of the magnitude of the offset through a tone encoded command.

When a note event list is used as the source of aural parameters and the audible tone reference does not occur on the accompaniment channel, some other source of audible tone reference is needed. As previously mentioned this could be a synthesizer or a computer based tone generator. The MCU 50 may also be used as a tone source. For example, the MCU 50 can generate tones by reading a wavetable stored in memory and send samples out to a DAC (see "Musical Applications of Microprocessors", chapter 13). A more basic tone generator is available in the MCU 50 by configuring the internal timer to generate a periodic rectangular wave. The duty cycle of the rectangular wave may be varied to alter the perceived volume and timbre.

Figure 4:
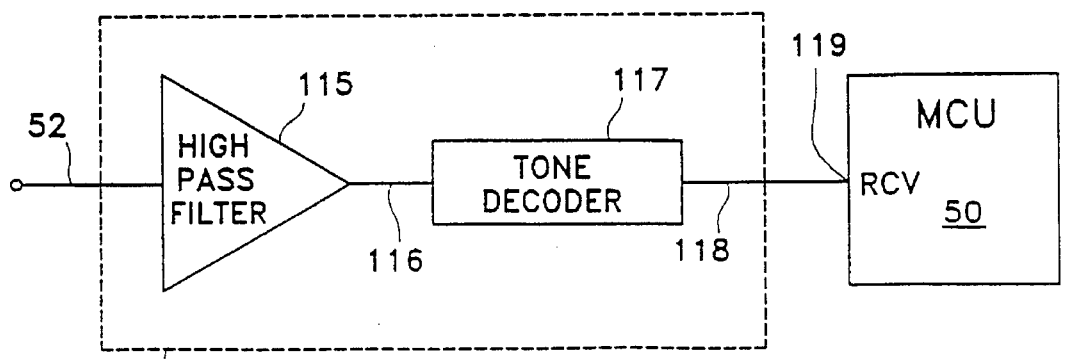
FIG. 4 illustrates schematically, by means of a simplified block diagram, the command tone decoder.

The block diagram of electronic circuitry set forth in FIG. 4 details the command tone decoder 53 which detects the presence of a command tone on the applied audio signal 52.

The monophonic reference signal 52 is a composite audio signal that contains a monophonic reference source and tone encoded commands for the MCU 50. There are several techniques of communicating data over an audio channel known to one skilled in the art such as frequency and amplitude modulation. The preferred embodiment uses the presence and absence of a fixed high frequency command tone (e.g. 10 kHz) to encode a standard asynchronous serial data format (e.g. Electronic Industries Association interface standard RS232-C). Referring to FIG. 4, the composite audio signal 52 is applied to the high-pass filter 115 that attenuates all frequencies lower than the command tone. The filtered signal 116 is applied to a tone decoder 117 whose output 118 goes low when the command tone is present. The output 118 of the tone decoder 117 is applied to the serial receive input (RCV) 119 of the MCU 50.

A preferred embodiment of the tone decoder 117 uses an LM567 (e.g. National Semiconductor 2900 Semiconductor Drive Santa Clara, Calif. 95051) described in the Linear Data Book 1988 edition Volume 3 page 5–62 to 5–67. A preferred embodiment of the high-pass filter 115 is a two-pole high-pass filter (not shown) taught on page 175 of Don Lancaster's book Active-Filter Cookbook (Howard W. Sams & Co., Inc. 4300 West 62nd St. Indianapolis, Ind. 46268).

Many functions, features, and data can be encoded in the tone commands. The tone commands can be viewed as a way of providing additional programming for the MCU 50. It is possible to load operating code for the MCU 50 over the reference channel using tone encoded commands. Some of the uses of the tone encoded commands are; turn functions on and off (e.g. loop, interval, harmony), set the tonic, display characters and text on display screen 22 (e.g. words to songs, instructions), point to items on the display screen 22 (e.g. aural parameters of the monophonic reference source), provide a note event list, and display reference aural parameters in advance of hearing the audible tone reference.

Figure 5:
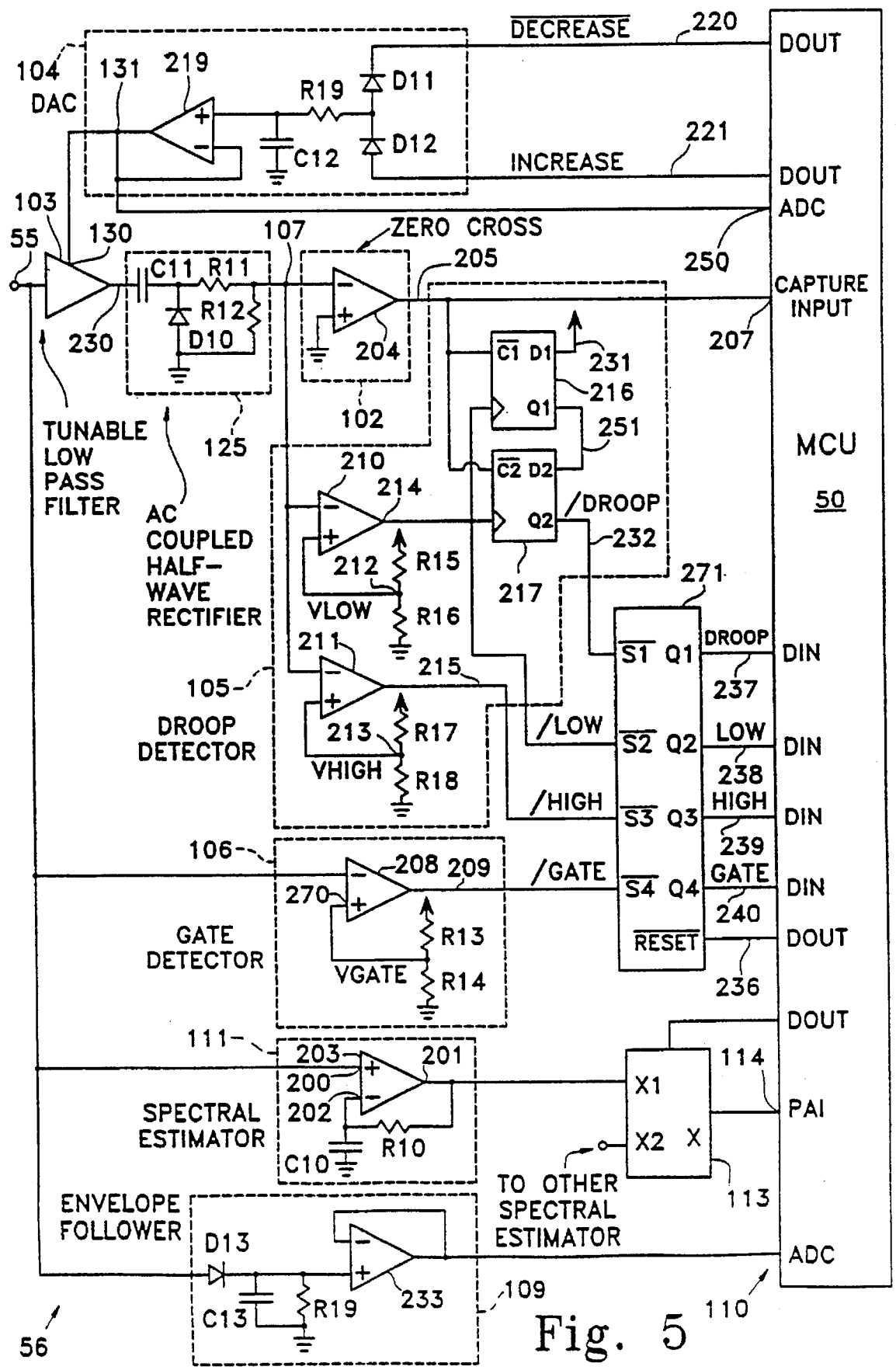
FIG. 5 illustrates a circuitry detail of the waveform analyzer.

Referring now to FIG. 5, the detailed operation of each section the waveform analyzer 56 will be examined.
Spectral Estimator 111

The timbre of the applied audio signal 55 is estimated and quantified by counting the number of times the slope of the waveform changes sign ("ripples"). These ripples generally arises from harmonics in the signal and are observed to increase per pitch cycle with the energy in the upper harmonics. The spectral estimator 111 counts the number of ripples in the waveform.

The audio signal 55 to be analyzed is applied to the non-inverting input 200 of the comparator 203. The output 201 of the comparator 203 is low-pass filtered by the combination of the resistor R10 and capacitor C10, and applied to the inverting input 202 of the comparator 203. The inverting input 202 lags the applied audio signal 55, and the output 201 changes each time the applied audio input 55 makes an appreciable change in slope sign and magnitude. The number of changes in the output 201 of the comparator 203 is counted by the pulse accumulator input (PAI) 114. Pulses on the PAI 114 input increments an internal counter inside the MCU 50. The single PAI 114 is shared by the two waveform analyzers 56 and 65 through the multiplexer 113.

Figure 6A:
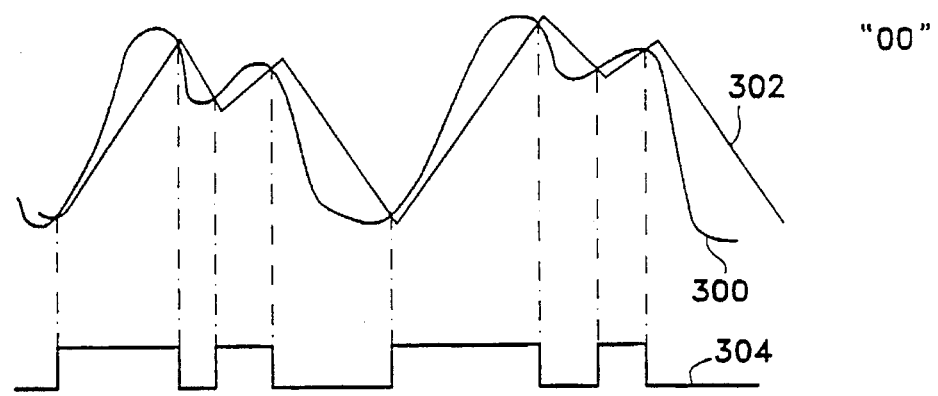
FIGS. 6A–6C illustrate by means of waveforms the operation of various circuits in the waveform analyzer.
Figure 6B:
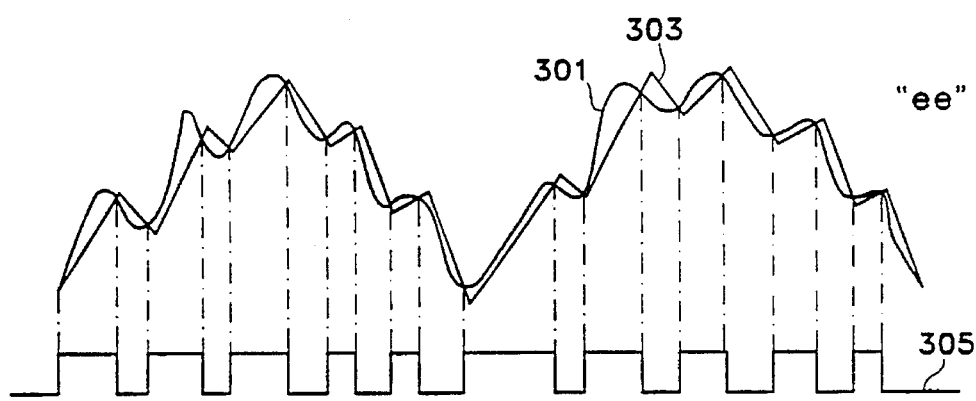

Referring to FIGS. 6A and 6B, waveform 300 and 301 represent the audio signal 55 applied to the spectral estimator 111 of the vocalized sound "oo" and "ee" respectively. These two sounds have different timbre. The "oo" sound has less energy in the upper harmonics and is perceived as having a more of a 'pure tonal quality' as compared to the "ee" sound which has more of a 'nasal' sound. In some styles of singing (e.g. choral) the former is preferred. Waveform 302 and 303 represent the low-passed version occurring at the inverting input 202 of the comparator 203. Waveform 304 and 305 represent the output of the comparator 203. The vowel "ee" contains more energy in upper harmonics than the vowel "oo", as seen by the greater numbers of ripples appearing in waveform 301 as compared to waveform 300. This is seen by the greater number of transitions occurring in waveform 305 as compared to waveform 304.
A.C. Coupled Half-Wave Rectifier 125

Referring to FIG. 5, the post-filtered audio signal 230 is a.c. coupled by capacitor C11 to remove any d.c. bias, half-wave rectified by diode D10, and attenuated by the resistor divider of R11 and R12 to reduce the maximum negative voltage of the resulting signal 107 to the rating of the comparators 204, 210, and 211 (e.g. −0.3 volts for the National Semiconductor LM324).
Zero Cross Detector 102

Figure 6C:
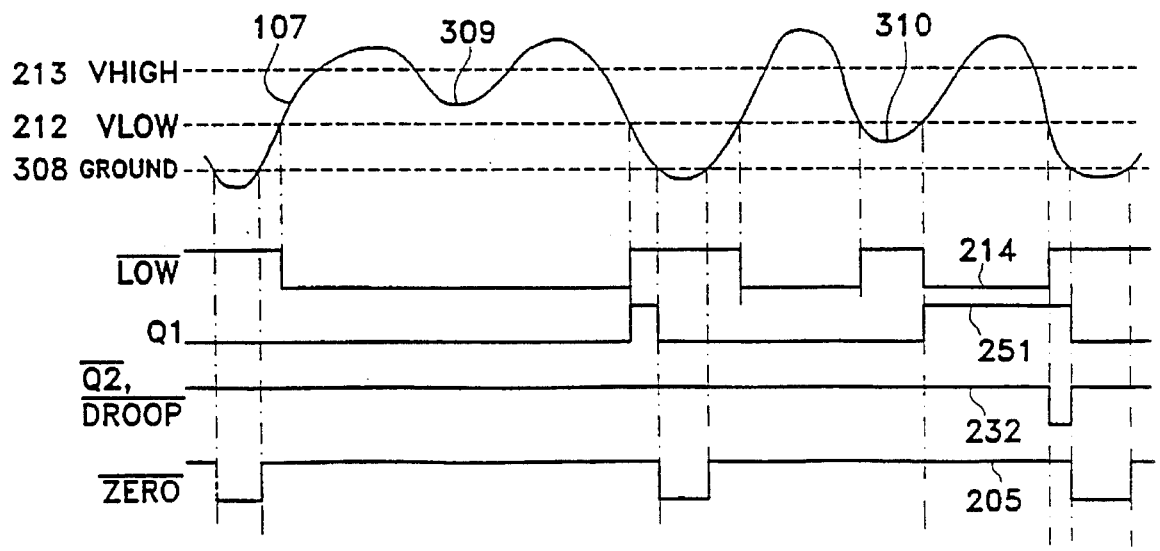

The zero cross detector 102 is a comparator 204 whose output 205 is high when the post-filtered audio signal 107 goes above ground. Referring to FIG. 6C, waveform 107 represents the audio signal applied to the zero cross detection 102. Waveform 205 represents the output of the zero cross comparator 204. When the input waveform 107 is above the ground reference 308, the comparator output 205 is low. The zero cross detector's output 205 is applied to the capture input 207 of the MCU 50. A rising edge on the capture input 207 causes the value an internal free running high speed counter (e.g. 1 MhZ) to be latched into an internal register and a software interrupt to be generated inside the MCU 50. An interrupt routing in the MCU 50 reads the internal register and calculates the period of the applied signal 107 by subtracting the latched value from the previous latched value. Frequency is the reciprocal of period. Since our ears perceive pitch logarithmically, a preferred embodiment of the invention converts period into the logarithmic frequency units of semitones and cents (hundredths of a semitone), where a semitone is a frequency increment of the factor the twelfth root of two. This conversion may be approximated by finding the nearest semitone by searching a table of frequencies for all audible semitones (about 100), and linearly interpreting between them. A further gain in conversion speed can be achieved if the frequency difference between neighboring semitones is also stored in the table.

Ideally the frequency output of the zero cross detector 102 corresponds directly to the pitch of the applied audio signal 55. Noise on the input 107 to the zero cross comparator 204 and transients as the filter 103 cutoff frequency is changed can cause deviations from the ideal pitch value. Pitch tracking errors can be reduced by filtering. In a preferred embodiment of the pitch tracker, extreme values of pitch are eliminated the remaining samples are averaged. In a preferred embodiment, the last 24 samples of pitch value are saved and arranged in ascending order (as entry 1 to 24) and the middle eight values are averaged (entry 9 to 16). In calculating the average, further computational speed is realized by shifting the binary sum three places to the right, rather than dividing by eight. The number of samples used (24 in this example) can be reduce for greater response time or increased to achieve greater filtering.

Gate Detector 106

The gate detector 106 indicates to the MCU 50 that the applied audio signal 55 is present. The gate detector 106 is a comparator 208 whose output 209 (/GATE) goes low when the applied audio signal is greater than the voltage reference (VGATE) set by the voltage divider R13 and R14. The output 209 of the comparator 208 is stored in the latch 210 (e.g. National Semiconductor 74LS279).

Droop Detector 105

The droop detector indicates the magnitude and tendency of the applied audio signal 107 to make more than two zero crossings per pitch cycle. The magnitude of the applied audio signal 107 is reported by the comparators 210 and 211. The output 214 and 215 of comparator 210 and 211, respectively, goes low when the amplitude of the applied audio signal 107 exceeds their respective threshold, VLOW 212 and VHIGH 213. The threshold VLOW 212 is set by the voltage divider composed of R15 and R16. The threshold VHIGH 213 is set by resistors R17 and R18. The outputs 214 and 215 are stored in the latch 210.

Referring to the waveforms of FIG. 6C, droop is the portion (or portions) of the waveform 107 above ground 308 where the slope is changing from negative to positive, occurring at point 309 and 310. Droop is caused by excessive energy in upper harmonics which can result in more than two zero crossing per pitch cycle. The droop detector's output 232 goes low after a droop 310 crosses the low threshold VLOW 212 set by the voltage divider R15 and R16. The droop detector 105 operates by counting the number of times the applied waveform 107 crosses the low threshold VLOW 212 during each pitch cycle. The pitch cycle is determined by the zero cross detector 102. Referring to the electronic schematic of FIG. 5 and the waveforms of FIG. 6C, when the applied waveform 107 is below the ground reference 306, the zero cross detector's output 205 is low which resets the droop detector's dual D-type flip flops 216 and 217 (e.g. National Semiconductor 74LS74). Upon reset the output 251 (Q1) of flip-flop 216 is low and the inverting output 232 (/Q2) of flip-flop 217 is high. The nature of a D-type flip-fiop's output is to adopt the state of its D input when clocked. When the waveform 107 falls below the threshold VLOW 310 the rising output 214 of comparator 210 clocks a high state into flip-flop 216 and a low state into flip-flop 217. If the waveform 107 falls below the threshold VLOW 212 for a second time in the same pitch cycle as it does at 310, a high is clocked into flip-flop 217, producing a low on the inverting output (/Q2) 232 which is saved by the latch 210.

When an input to the flip-flop 271 goes low (e.g./DROOP 232) the output stays high (e.g. DROOP 237) until the MCU 50 reads the line and resets the flip-flop 210 by pulsing the reset line 236 low. The following discussion on filter control will use the positive logic version of signals (i.e. DROOP 237 as compared to the negative logic version/DROOP). If the GATE 240 is low (i.e. there is no applied input signal 55 present), filter control routine does not change the filter cutoff frequency. If the GATE 240 is HIGH, the filter control routine examines the state of DROOP 237, LOW 238, and HIGH 239 and takes the action set forth in TABLE 3, below;

TABLE 3

| DROOP 237 | LOW 238 | HIGH 239 | ACTION |
|---|---|---|---|
| LOW | LOW | LOW | increase cutoff frequency |
| HIGH | X | X | decrease cutoff frequency |
| LOW | HIGH | LOW | remain the same (do nothing) |
| LOW | HIGH | HIGH | decrease the cutoff frequency |

Nomenclature:
X = Don't care

An action of increase means the cutoff frequency is increased by an increment, decrease means the cutoff frequency is decreased by an increment, and remain the same means the cutoff frequency is not changed. The cutoff frequency increment used is dependent on the characteristics of the filter 103 and DAC 104. For example, large increments would be used with a filter 103 having a long settling time. Steps on the order of 1 to 6 semitones are typical.

If the advanced pitches of the monophonic reference are known, as in the case of a note event list, the cutoff frequency of the filter for the student may be guessed in advanced based on upcoming pitches.

Low-Pass Filter 103

There are many ways to implement a tunable low-pass filter. For example a bank of fixed cutoff filters can be selected with an analog multiplexer (e.g. National Semiconductor CD4051), or the active components of the filter (e.g. capacitors and resistors) that determine the cutoff frequency may be electronically changed with a multiplexer (e.g. National Semiconductor CD4066). Other examples may be found in Chapter 9 of Don Lancaster's book Active-Filter Cookbook. For simplicity a 4-pole tunable low-pass filter 103 is shown (e.g. CM3320 Curtis Electromusic Specialties 110 Highland Avenue Los Gatos, Calif. 95030). The cutoff frequency of the tunable low-pass filter 103 is determined by the voltage on the control input 130, set by the DAC 104 under the control of the MCU 50.

The performance of the pitch tracker may be improved by maximizing the amplitude (without clipping) applied to the low-pass filter 103. This may be done by adding an automatic gain control (not shown) circuit at the input of the filter 103.

An inexpensive DAC 104 is implemented with diodes D11 and D12, resistor R19, capacitor C12, and operational amplifier 219 (e.g. National Semiconductor LM324). When the/DECREASE line 220 is high and the INCREASE line 221 is low, the voltage on capacitor C12 is maintained. When the/DECREASE line 220 goes low, the voltage on capacitor C12 decreases as it discharges through resistor R19 and diode D11. When the INCREASE line 221 goes high, the voltage on capacitor C12 increases as it charges through resistor R19 and diode D12. Operational amplifier 219 is configured as a voltage follower to prevent the control voltage input 130 from loading the capacitor C12. The voltage output of the DAC 131 is monitor by the MCU 50 by the analog-to-digital channel 250.

Envelope Follower 109

The envelope follower 109 determines the overall amplitude of the applied waveform 55. The envelope follower 109 extracts the maximum amplitude of the waveform with the peak tracking circuit composed of diode D13 and capacitor C13. Resistor R19 discharges capacitor C13 to allow the envelope follower 109 to track waveforms of decreasing amplitude. Operational amplifier 233 (e.g. National Semiconductor LM324) is configured as a voltage follower to buffer the capacitor C13 from the analog-to-digital input 110 of the MCU 50.

If an AGC (automatic gain control) circuit is used anywhere in the signal path of the applied waveform 55, for example to compensate for variations in microphone 14 output, it is preferred to have the envelope follower 109 input 235 receive the applied waveform 55 before the AGC to assure a valid measurement of waveform amplitude.

Referring to FIGS. 7 to 12, several examples of visual representations of aural parameters used in the preferred embodiment of the invention are shown. In all of the visual representations of FIGS. 7 to 12, the vertical axis represents pitch and the horizontal axis represents time.

Figure 7:
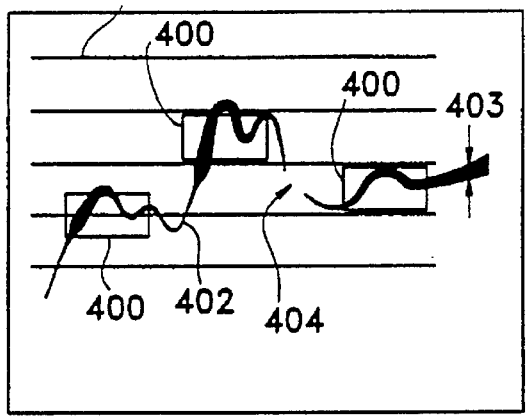
FIGS. 7–12 illustrate visual representations of aural parameters used in the preferred embodiment of the invention.

In FIG. 7 a sequence of three notes from a monophonic reference source of constant timbre and amplitude and stable pitch, such as produced by a square wave generator, appears as discrete horizontal bars 400 on parallel horizontal reference lines as shown in the drawings. The stable pitch is visually indicated by the fixed vertical position of each bar 400. The constant amplitude is visually indicated by the uniform thickness of the bars 400. The constant timbre is visually indicated by the uniform color (not shown) of each bar 400. The aural parameters of the student are represented by the line 402, whose thickness 403 represents amplitude, and disappearance 404 indicates silence. Timbre is represented by the color of the line 402 (not shown).

Figure 8:
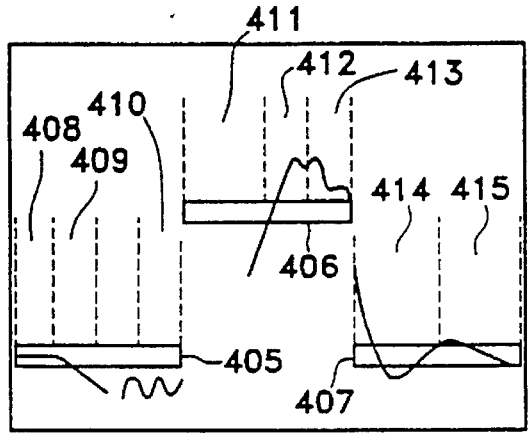

In FIG. 8 a series of three monophonic reference notes 405, 406 and 407 of constant timbre and amplitude and stable pitch are plotted along with the aural parameters of the student, segments 408–415, delineated for purposes of illustration by dashed vertical lines not actually seen on the display screen 22. The display speed is fast enough to reveal features of the student's voice. Segment 408 shows good pitch matching followed by poor pitch sustaining ability in segment 409. Segment 410 shows vibrato that is centered below the reference tone 405. This would sound flat to a trained musical ear. Segment 411 shows a late start with overshoot in segment 412 when approaching the desired tone 406, followed by poor correction in segment 413. Segment 414 shows undershoot followed by a fast and accurate recovery in segment 415.

Figure 9:
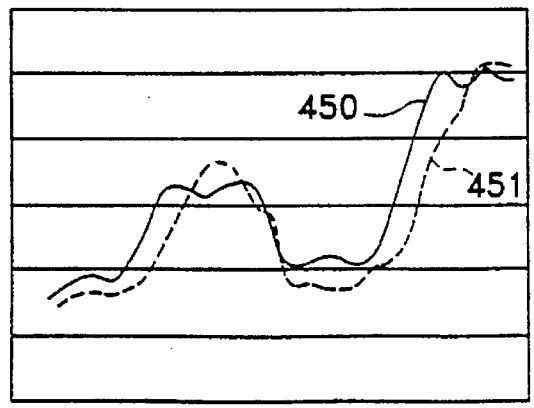

FIG. 9 shows the aural parameters of intonations of the human voice as the monophonic reference source 450 plotted with the aural parameters of intonations of the student 451. The sources of intonation aural parameters 450 and 451 are visually distinguished from each other by brightness, indicated by the dashed line 451 and solid line 450. The overall vertical displacement of the student's tone line 451 below the monophonic reference line 450 indicates that the student is consistently singing flat.

Figure 10:
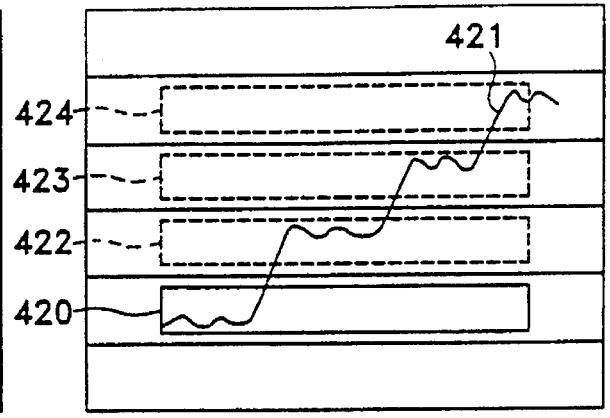

FIG. 10 illustrates a monophonic reference source 420 of constant pitch, timbre, and amplitude plotted with the aural parameters of student intonation 421, along with a visual representation of the musical intervals third 422, fifth 423, and eighth 424 (octave). Intervals 422–424 are distinguished from reference tone 420 and student tone 421 by brightness, indicated by dashed line.

Figure 11:
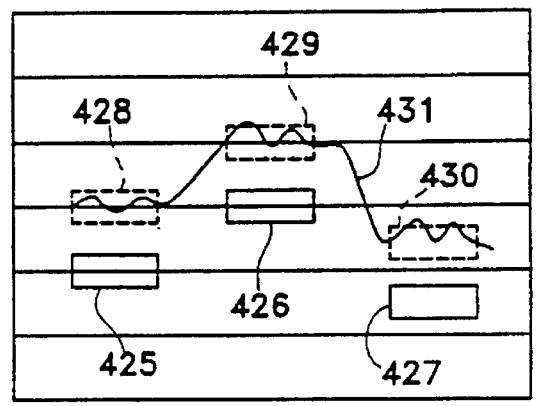

FIG. 11 illustrates three notes 425–427 of a melody played by a monophonic reference source of constant timbre, amplitude, and stable pitch. Bars 428–430 indicate harmony notes (e.g. a third interval) above the three monophonic reference notes 425–427. Visualization of student aural parameters are represented by line 431. Harmony bars 428–430 are distinguished from monophonic reference notes 425–427 and student intonation 431 by brightness, indicated by dashed line.

Figure 12:
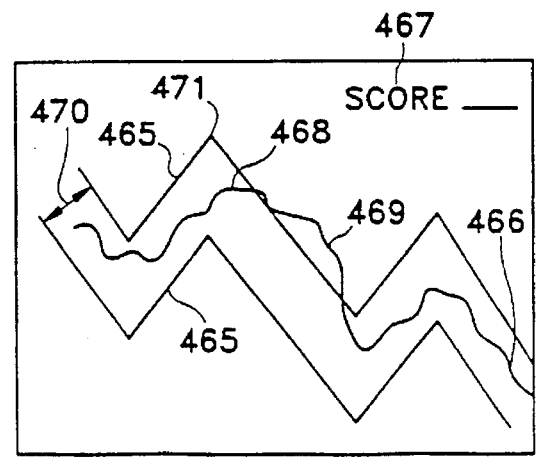

FIG. 12 illustrates a maze where the boundary 465 represents the pitch range the singer must confine their voice to in order to navigate the maze. The student's aural parameters are plotted left to right and progress through the maze is indicated by the line 466. The performance of the student is displayed in the form of a score 427 calculated by the host computer 13. The score 467 is incremented as the student maintains their pitch within the boundary 465 of the maze (e.g. at location 468), and subtracted each time the student's pitch exceeds the boundary 465 of the maze (e.g. location 469). The difficulty of the maze is determined by the width 470 of the boundary 465, the display speed, and the sharpness of the boundary turns in the maze (e.g. corner at location 471 ). This exercise helps increase the vocal range and pitch control of the student in the enjoyable context of a game.

Further applications and embodiments of the invention are derived from the use of the video output 40 provided by the invention 10.

Figure 13:
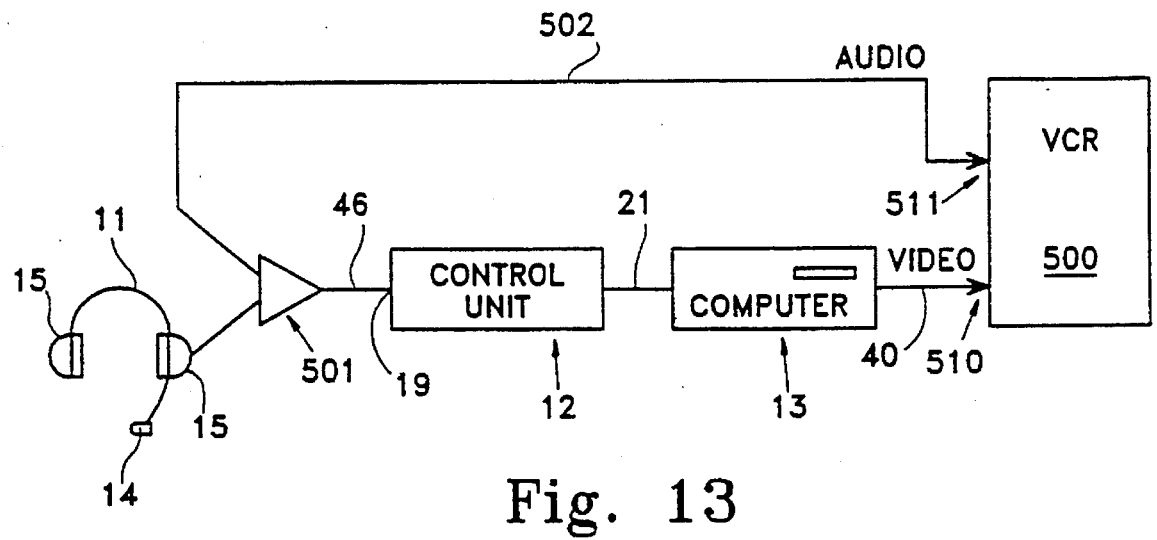
FIG. 13 illustrates schematically, by means of a simplified block diagram, an application of one embodiment of the invention that records on video tape the performance of a student

FIG. 13 shows the invention 10 used with a video tape recorder 500. The video output 40 of the host computer 13 is applied to the video input 510 of the video tape recorder 500. The combined audio signal 46 from the control unit 12 is applied in parallel to both the student's headset 11 and the audio input 511 of the video tape recorder 500 through an audio connector 501 (commonly referred to as a 'Y' connector). The video record can be used, for example, by a music instructor to review the homework of a students.

Figure 14:
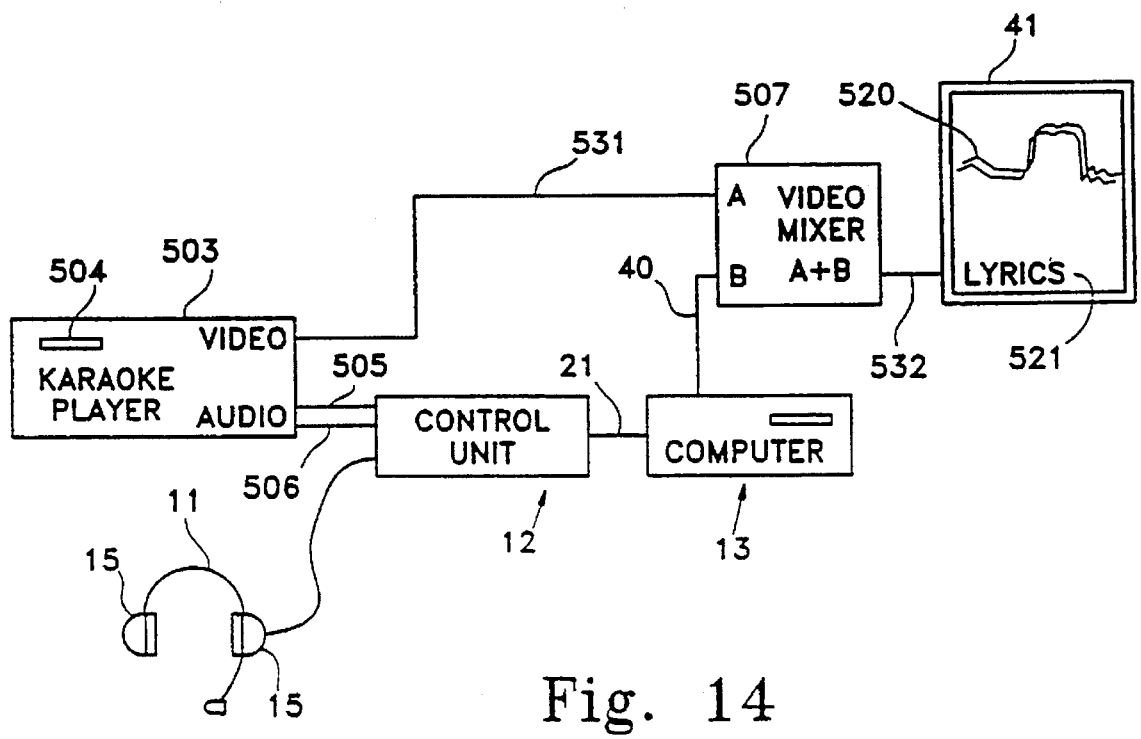
FIG. 14 illustrates schematically, by means of a simplified block diagram, an application of one embodiment of the invention that produces a superimposed image of a karaoke player's video output with a temporal visual representation of the singer's aural parameters.

FIG. 14 shows an application of the invention 10 using a karaoke player 503 (e.g. the JVC RC-GX7) as the monophonic reference source. The visual representation of aural parameters 520 provided by the invention 10 are visually superimposed with the visual image 521 provided by the karaoke player 503.

The karaoke player 503 displays a visual image of the lyrics 521, provides a solo lead vocal audio channel 505 (the monophonic reference source), and an accompanying music audio channel 506 (the audible tone reference) to a song selected from the optical disk 504. Referring to FIG. 2, the karaoke player 503 replaces the tape player 17 as the monophonic reference. Audio channel 505 and 506 is applied to channel switcher 51 through audio lines 47 and 48 respectively.

Two video sources may be electronically combined to produce one image that contains the visual material of one source superimposed onto the other. This technique is commonly used to add titles to video, as in a video character generator. For purposes of illustration a digital effects processor and mixer 507 (Panasonic WJAVE5) is used to combine the video signal 40 from the invention 10 with the video signal 531 from the karaoke player 503. The combined video signal 532 is displayed on a video monitor 41.

The karaoke player 503 contains a combination of digital control, analog signal, and image processing hardware necessary to carry out the numerous tasks of the player 503. For clarity the components of the application shown in FIG. 14 are kept discrete. In practice the functions of the individual system components may be integrated to produce an economic and contained system by taking advantage of similar operations, such as image processing in the karaoke player 503 and video mixing by the digital effects processor and mixer 507. Such integration of hardware can be done without departing from the spirit of the invention. It is conceivable that a karaoke machine can be constructed to provide, as a built in feature, a visual representation of aural parameters superimposing or replacing the programmed material, as taught here, to guide, assist, and instruct the singer.

PREFERRED EMBODIMENT OF DIGITAL SINGING COACH

Figure 15:
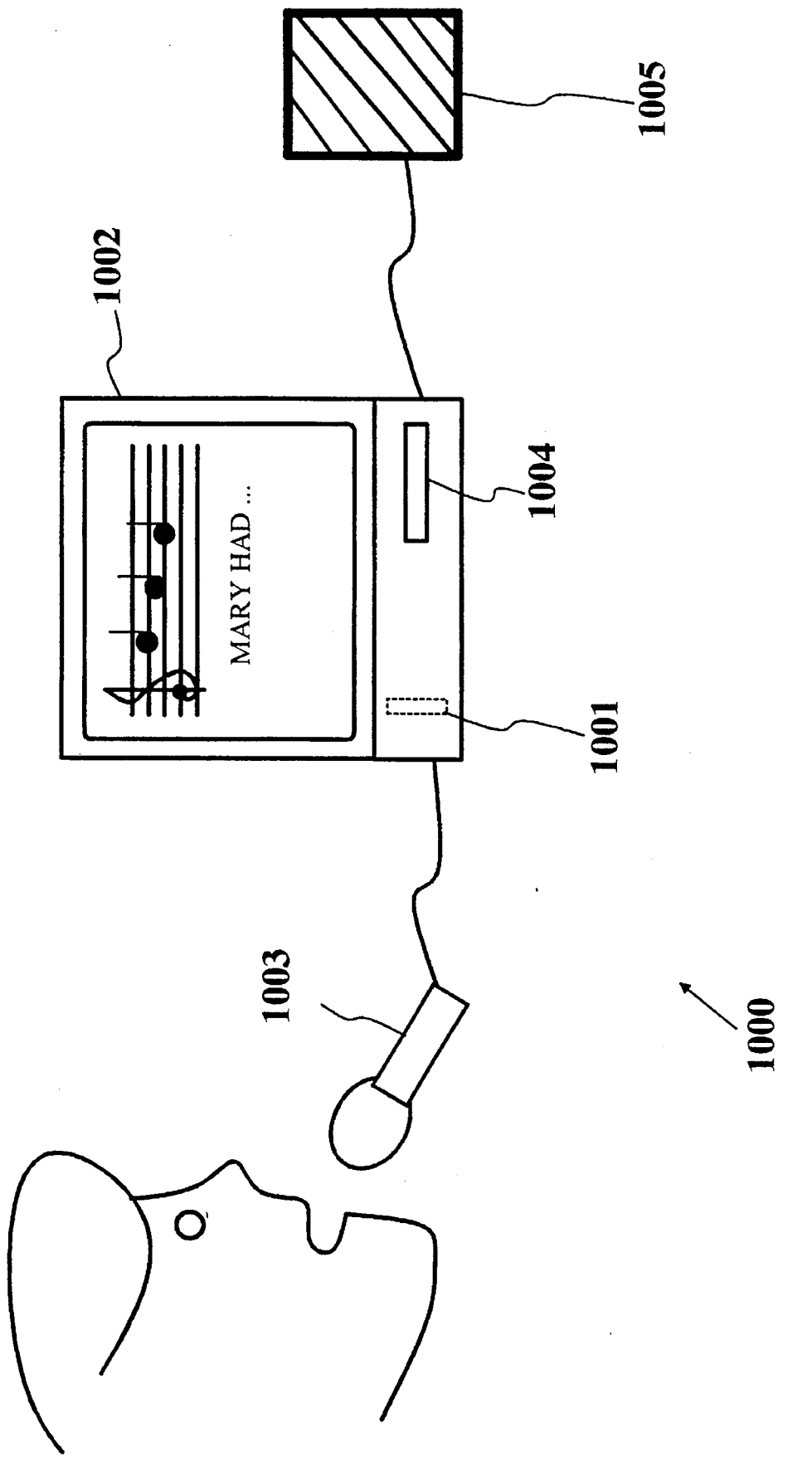
FIG. 15 is a sketch of a music training system with a digital pitch tracker.

As described above, the pitch tracker utilizes a tuned low-pass filter. FIG. 15 provides a sketch of a music training apparatus 1000 using a pitch tracker 1001 that operates on digitized sound samples, such as provided by Sound Blaster (Creative Technology Labs), a computer hardware peripheral that digitizes sound. This sound peripheral, and its equivalents, are installed in a large number of computers. The system 1000 includes a monitor 1002 displaying notes and lyrics as described above, a microphone 1003, a speaker 1005, and a disk drive 1004, or other storage medium. Some computers, like those produced by Apple computer, the so called Multi-media computers, are manufactured with a microphone and digitizer built in.

Sound digitizers operate by sampling sound amplitude at fixed intervals (the sampling rate) and storing the sound samples in memory (sound buffer). A typical sample rate necessary for providing pitch estimates of a singing person is 15,000 samples per second. To reduce the amount of memory the pitch tracker uses, the digitized sound samples are stored in a ring buffer long enough to store two cycles of the lowest fundamental period expected. The fundamental period is the reciprocal of the pitch period. A typical lowest frequency expected for an adult male is 60 Hz. and corresponding to a fundamental period of 16.67 milliseconds. At a sample rate of 15,000 Hz. a buffer of 500 bytes would be required.

The digitized sound stored in the ring buffer represents a frame of sound. The pitch tracker reduces the data in the frame by saving the amplitude peak and energy sum of every crest of the waveforms. A crest is the positive portion of a waveform. Significant amplitude peaks and sums are marked and used to generate several pitch determination channels. The pitch tracker evaluates the error of each channel and selects the channel with the least amount of pitch errors. The fluctuations of pitch in the selected channel are reduced and a singular pitch is determined for the frame.

The analysis used by the pitch tracker is optimize for speed by limiting operations to addition, subtraction, comparison, and shifts. In an alternate embodiment memory usage can be further reduced by preforming the initial frame analysis "on the fly", processing samples as they are collected. The initial analysis examines the amplitude of the last three sound samples, eliminating the need for the ring buffer.

The analysis can also be preformed on troughs (negative part of waveforms) doubling the number of pitch determinations. However is has been found that analysis of crests is sufficient for accurate and reliable pitch determination.

Figure 16:
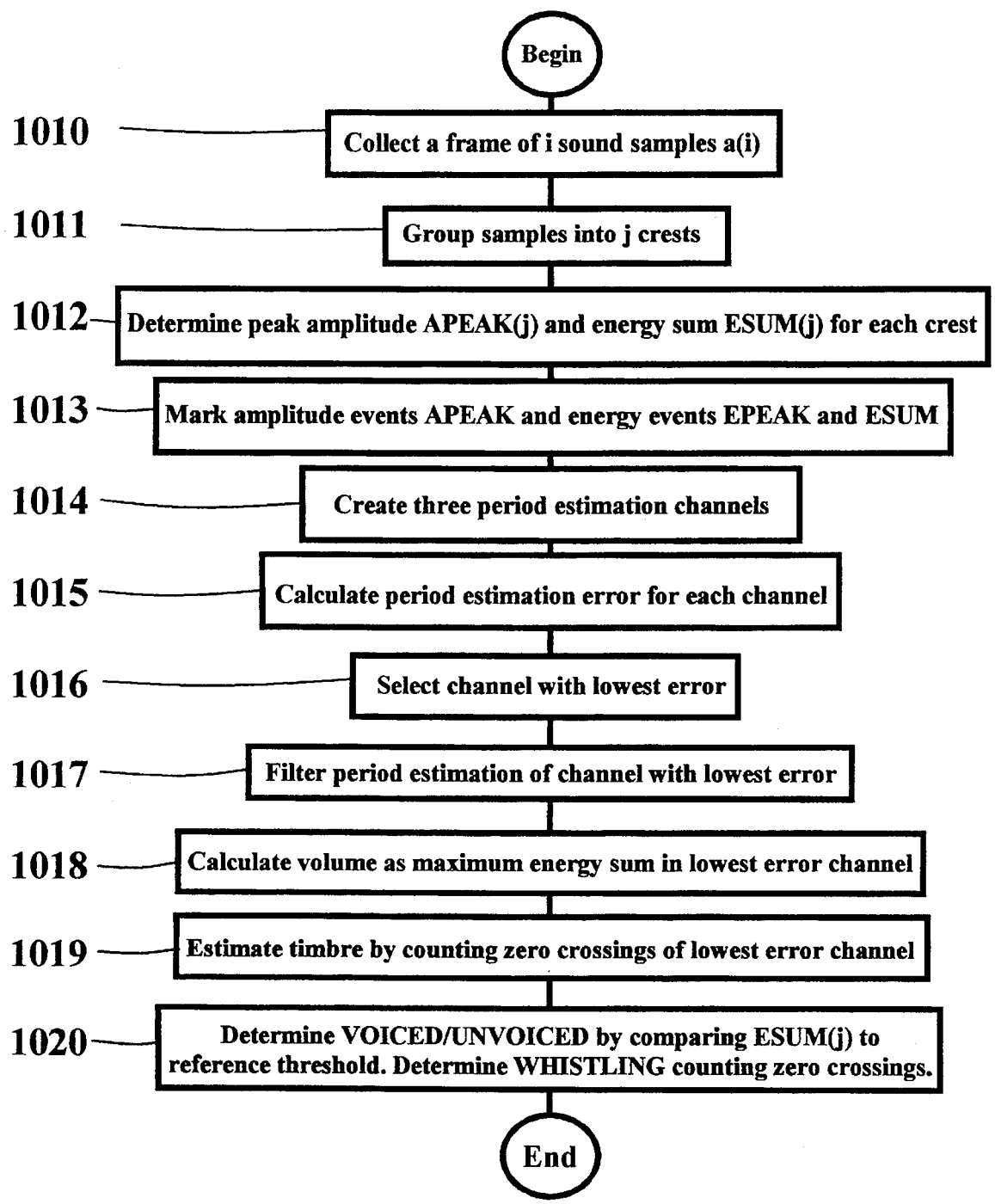
FIG. 16 is a flow chart of a main control loop for the digital tracker of FIG. 15.

FIG. 16 shows the operational procedures of the preferred embodiment of the pitch tracker are as follows;

1) RECORD. Collect a frame of sound samples 1010. The collection of sound samples is provided by the host hardware and is described in documentation provided by the manufacture. In general the sound digitizing hardware is periodically sampled by a software interrupt routine which transfers the analog-to-digital conversion of sound amplitude to a location in memory.

2) PROCESS CRESTS. Determine amplitude peaks and energy sums. In the preferred embodiment of the invention the frame is divided into crests 1011, the sections of a waveform which are positive, by detecting zero crosses. A crest starts with a positive going zero crossing and ends with a negative going zero crossing. For each crest the time and value of the sample with the greatest amplitude is stored (peak amplitude), the sum of the amplitudes is stored (energy sum), and the time of the negative going zero crossing are stored.

Figure 17:
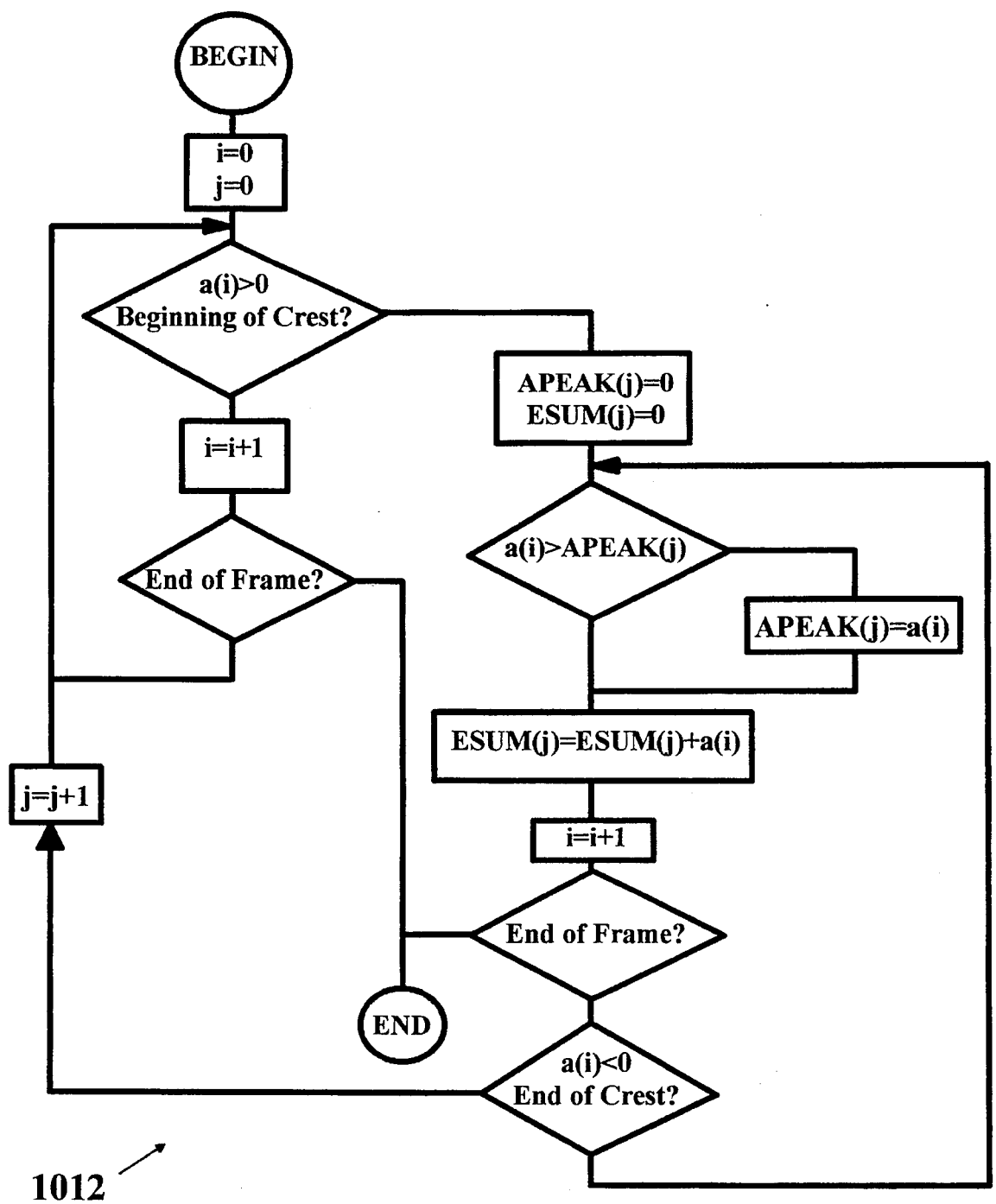
FIG. 17 is a flow chart of the algorithm used in step 1012 of FIG. 16.

3) MARK EVENTS. Analyze crests and mark significant amplitude peaks and energy sums 1013. A more detailed flow chart of this step is provided in FIG. 17, which is self-explanatory. Three types of events are marked; significant amplitude peaks (APEAK), energy peaks (EPEAK), and energy sums (ESUM). An amplitude peak event is detected when an amplitude peak is greater than the amplitude peaks immediately proceeding and following, and the amplitude peak is greater than ¾ of the largest amplitude peak occurring in the frame. The threshold of ¾ is chosen empirically and is particularly useful since it can be calculated without multiplications by preforming two shifts and a subtraction. An energy peak event is detected when an energy sum is greater than the energy sums immediately proceeding and following, and the energy sum is greater than ¾ of the largest energy sum occurring in the frame. An energy sum event is any energy sum that is greater than ¾ of the largest energy sum occurring in the frame.

Figure 18:
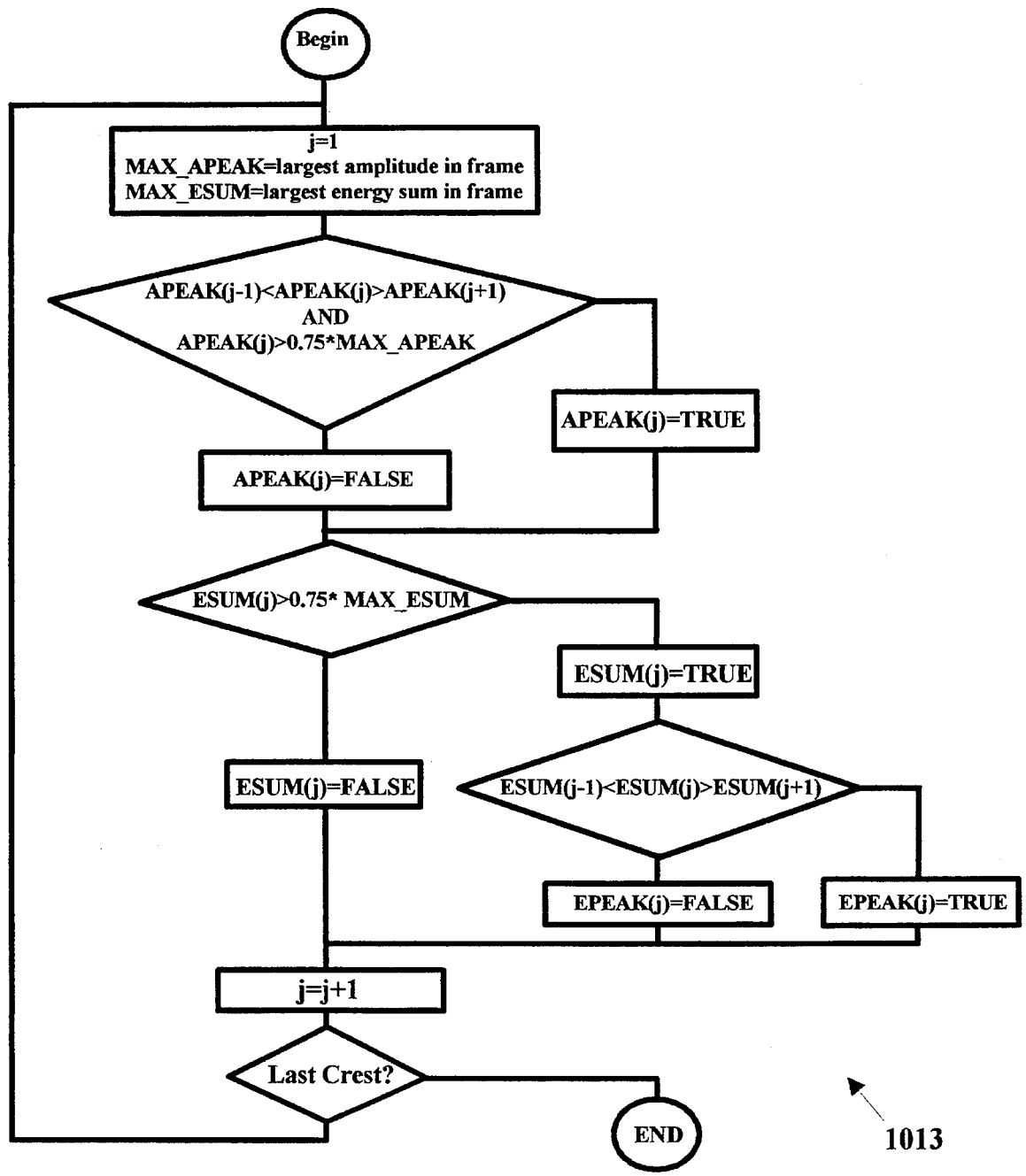
FIG. 18 is a flow chart of the algorithm used in step 1013 of FIG. 16.

4) CREATE CHANNELS. Create three channels of possible pitch determinations 1014. A more detailed flow chart of this step is shown in FIG. 18, which is self-explanatory. A channel is a sequence of pitch estimations calculated as the twelfth root of two of the time between logical combinations of marked events. This calculation converts period into the logarithmic units of pitch (i.e.,. semitones). For optimal speed and memory usage, a this calculation is preformed by a combination of look-up table and look-up interpolation, to avoid any time consuming multiplications and divisions. In practice a pitch resolution of ⅛ of a semitone has proven satisfactory for vocal training. The logic combinations of marked events for the channels are as follows;

Channel 1 ESUM -OR- EPEAK-OR- APEAK

Channel 2 APEAK -AND- ESUM

Channel 3 ESUM -AND- EPEAK

5) CALCULATE CHANNEL ERROR. Calculate error for each channel 1015. Error for each channel is calculated as the sum of the number of times adjacent pitch estimates vary by more than a fixed threshold, for example two semitones.

5) SELECT CHANNEL. Select channel with the smallest error 1016. If a channel has no events or if a channel has more than half of its pitch estimates in error, that channel is disqualified.

6) SMOOTH PITCH SIGNAL. Reduce jitter of selected channel 1017. Pitch estimates vary from cycle to cycle due to errors in pitch measurement, sampling error, background sound and noise, and the performance of the user. The pitch estimations can be smoothed out by filtering. Averaging several pitch estimates is one method. A preferred method is to choose a median value of the last several pitch estimates. In a preferred embodiment the last five pitch estimations are sorted using a bubble sort, and the middle value is chosen as the valid pitch estimate. Additional jitter may be encountered when a new channel is chosen. To reduce jitter from channel changing, the maximum value of the last several pitch estimates may be chosen. In a preferred embodiment the last 5 period estimates are median bubble sorted and the maximum value of the last 3 period estimates from the bubble sort is chosen as the valid pitch.

7) VOLUME. Determine the volume of the applied audio signal 1018. In a preferred embodiment volume is calculated as the maximum energy sum occurring in a frame.

8) TIMBRE. Estimate the timbrel (spectral) brightness of the applied audio signal 1019. Higher harmonics that are responsible for the perceived brightness of a sound produce ripples in a waveform, increasing the number of zero crossings. The brightness is determined by counting the number of zero crossings that occur in a frame.

9) VOICED/WHISTLE/UNVOICED. Determine if the signal is voiced (pitched), whistled (pure tone) or unvoiced (noisy) 1020. It is often useful to determine if the user is singing, talking, whistling, breathing into the microphone, or silent. Unvoiced sound (e.g. white noise) has lots of high energy harmonics producing many small amplitude crests of short duration, each of which have very little energy. Voiced sounds (e.g. singing and whistling) produces long duration crests, each with appreciable energy sums. The energy sum provides a good indication of voiced/unvoiced signal. The thresholds for these decisions are determined empirically.

Whistling is basically the production of a pure high pitched tone which produces one crest per pitch cycle. Examining the number of zero crossings per frame indicates the presence of whistling. Whistling is detected when the number of zero crossings per frame exceeds a threshold. For a male singer typically this would be the number of zero crossing equalivant to 500 Hz (e.g., 30 zero crossings at a sample rate of 15,000 samples per second).

Two examples of a computer program, written in the programming language C for an IBM compatible computer with a Sound Blaster card, are provided in APPENDIX 1 and APPENDIX 2 that implement the aforementioned procedures.

APPENDIX 2 includes a program labeled PT1.C. PT1.C is an alternative embodiment of the pitch tracker using the features of crest energy sum and amplitude peak to generate three feature markers; energy sum (ESUM), amplitude peak (APEAK), and peak energy sum (referred to as PEAK in PT1.C). The coincidence of markers is checked for each crest. First, the marker composed of ESUM AND PEAK and the marker composed of APEAK AND PEAK both appear together in a crest, the respective periods they indicate are compared. If the periods are about equal, the period is calculated as the average of the two periods. If the periods are too dissimilar, the period from the marker composed of APEAK AND PEAK are compared to the last valid period. If these two periods are about equal, the period determined from the APEAK AND PEAK marker is the new period. If neither of these conditions are true, the period determined from the marker composed of ESUM AND PEAK is used as the new period.

The programs could be rewritten in assembler language to gain appreciable speed and consume less code memory, though for many applications the pitch tracking procedures are time efficient enough to be written in the more readable and easier to code high-level programming language C.

While the above provides a full and complete disclosure of the invention, modifications, integrations, alternate implementations and constructions will naturally occur to those skilled in the art, without departing from the true spirit and scope of the invention. Therefore, the above description and illustrations should not be construed as limiting the scope of the invention which is defined in the following claims.

APPENDIX 1

Copyright 1994 Thomas Zimmerman

```
#if 0
************************************************************
MUSIC TRAINING APPARATUS - SOFTWARE PITCH TRACKER
=====================================================
Thomas G. Zimmerman Runs with a SoundBlaster card.  Records a section of sound, determines
the pitch, and plots and  prints the resulting pitch determination on the
screen. The pitch tracker records a frame of sound (639 samples of s ound
at 15,000 samples per second), extracts samples that represent amplitude
peaks (APEAK), integrates the energy (ESUM) for each crest of the sound
wave (the samples between positive zero crossing), creates three channels
of period estimation, and selects the channel with the least amount of
pitch jitter (variations of adjacent pitch values).

Brightness (spectral timbre) is estimated by counting the number of zero
crossings per frame.  The greater the number of zero crossings, the
brighter the timbre.

Volume is determined as the maximum energy summation for each positive
pitch cycle.

Whistling is detected by the presence of a high frequency, determined
when the number of zero crossings in a frame exceeds a threshold
(WHISTLE_THRESH).

The program plots pitch as a function of time, and updates a printed
value of pitch in the upper left corner of the display.
************************************************************
endif include  <io.h>
include  <dos.h>
#include  <bios.h>
#include  <stdio.h>
#include  <fcntl.h>
#include  <string.h>
#include  <stdlib.h>
#include  <graph.h>
#include  <sbc.h>
#include  <sbcvoice.h>
#include  "loaddrv.c"
#include  "c:\qc2\include\song.h"

#define  NOTHING   0         // no marker
#define  EPEAK     1         // big energy sum peak in sequence        //
of small-big-small with big > 3/4 of                                   //
last big
#define  ESUM      2         // esum 3/4 of maximum esum for frame
#define  APEAK     4         // big apeak in sequence of
                                    // small-big-small with big 3/4 of last
                                    // big
#define  PROCESS   5         // spectrum command
#define  RESULT    6         // spectrum command
#define  FORCED_ERROR 99     // value to indicate channel has bad
                                    // pitch estimate
```

```
#define  XMAX  639           // graphics horizontal resolution also     //
the number of sound samples in a
                             // frame, about 23.5 Hz (15000 samples
                             // per sec/639 samp per frame)
#define  YMAX  479           // graphics vertical resolution
#define  MAX_PERIOD  300     // 50 Hz
#define  MIN_PERIOD   30     // 500 Hz
#define  EC_SIZE     100     // maximum number of events expected       //
in a frame
#define  ZERO        128
#define  BUFFER_LEN    5
#define  BUBBLE_LEN    5
#define  LEADER       50     // first samples are wacky so ignore
#define  MAX_SAMPLES XMAX
#define  VOICED_THRESH 5     // energy must be above
                             // this to register as voiced
#define  ERROR_EIGHTS 16     // 2 semitones
#define  NO_PITCH      0
#define  PBUFFER       3     // pitch buffer to further reduce pitch    //
jitter
define  WHISTLE_THRESH 30 int BRIGHTNESS=0;            // spectral extimate based on number of    //
zero crossings per frame
int WHISTLE=0;               // frequency of whistling based on         //
number of zero crossings per frame
int JUMP_COUNT=0;            // occurances of amplitude peak double     //
previous amplitude peak.  Indicates                                     //
noisy signal usually caused by                                          //
blowing directly into microphone.
int ZCOUNT=0;                // number of zero crossings in a frame
int VOLUME=0;                // volume calculated from esum (energy     //
sum per positive pitch cycle)
int best_channel=0;          // channel determined to be with least     //
pitch errors
int esmax;                   // number of events in a frame
int  xpeak[EC_SIZE],  apeak[EC_SIZE],  esum[EC_SIZE],  xz[EC_SIZE];  int
mark[EC_SIZE];
int pbuf[PBUFFER],pptr;      // pitch estimates after bubble sort
int s[3][BUFFER_LEN];        // event marker buffers
int sptr[3];                 // event marker buffer pointers
int bub[BUBBLE_LEN];         // samples in bubble sort buffer
int bubptr[BUBBLE_LEN];      // sample number, indicating order         //
of sample entry
int bptr;                    // bubble buffer pointer
int count[3];                // counts number of events in a frame      //
for a channel
int plog[400];               // log table to convert linear period      //
to log frequency (eights of                                  // semitone)
int WILDNESS=0;              // fluctuation of pitch in a frame
int max_esum=0;              // largest energy sum for a frame
char far vi[MAX_SAMPLES+LEADER+4];  // sound samples in a frame void load_plog(void)
// load the period to pitch log table
{   int num_read;
    FILE *efile;

if ((efile=fopen("ptable.dat","rb"))==NULL)
       printf("LOAD ERROR: could not open PTABLE.DAT for load");
```

```
            else
               num_read=fread(plog,sizeof(int),400,efile);
            fclose(efile);
         } void record(void)
      // starts a frame worth of digital sound recording
      // preformed in the background by interrupt
         {   if (ctvm_input(vi,MAX_SAMPLES+LEADER,15000) != NO_ERROR)
                printf("Problem with record function\n");
         } void initialize(void)
      // clear buffers, load log table, start recording a frame
         {   int i,j;

ctvm_speaker(0) ;
            for (i=0;i<BUFFER_LEN;i++)
                for (j=0;j<3;j++)
                   {  bub[i]=0;
                      s[j][i]=0;
                      bubptr[i]=i;
                      bptr=0;
                   }
            load_plog();   // loads the period to pitch conversion table
            record();      // starts the recording of a frame of sound
         } int start_pt(void)
      // check Sound Blaster card, initialize program variables
         {  extern   char far * near voice_drv;
            char     far *lpVoiceBuf ;

/* Retrieve the BLASTER environment settings */
            if ( ! GetEnvSetting() )
            {  if (sbc_check_card() & 4)
                  {  if (sbc_test_int())
                        {  if (sbc_test_dma() >= 0)
                              { if (voice_drv = LoadDriver("CT-VOICE.DRV"))
                                 {  if (!ctvm_init())
                                       initialize() ;
                                 }
                              }
                           else
                              printf("Error on DMA channel.\n");
                        }
                     else
                        printf("Error on interrupt.\n");
                  }
               else
                  printf("Sound Blaster Card not found or wrong I/O settings.\n") ;
            }
            else
               printf("BLASTER environment not set or incomplete or invalid.\n");
         } void end_pt(void)
      // close Sound Blaster card
         {  ctvm_terminate() ;
         }
```

```
int get_log(int p)
// convert period to a log pitch frequency
{   if (p<300 && p>0)
        return(plog[p]);
    else
        return(0);          // out of range error
} void spectrum(int cmd,int a)
// Make spectral estimate by counting zero crossings
{   static unsigned b,slope,scount,hfcount,sign,acc,x;

if (cmd==PROCESS)
    {   if (a<ZERO && sign)
        {   sign=0;
            ZCOUNT++;
        }
        else if (a>ZERO)
            sign=1;
        return;
    }
    else
    {       // ignor whistle if occurance of amplitude jump, probably         //
caused by person blowing directly into the mic
        if (ZCOUNT>WHISTLE_THRESH && !JUMP_COUNT)
            WHISTLE=ZCOUNT;
        else
            WHISTLE=0;
        VOLUME=max_esum-150>>2;
        if (VOLUME>127)
            VOLUME=127;
        if (VOLUME<0)
            VOLUME=0;
        return;
    }
} void fill_energy(unsigned char far *ei)
// go through every sound sample and save amplitude peaks (apeak) // and
times (x), and accumulate energy sum (esum) for every // crest (samples
between positive zero crossings).
{   int x=0,i=0;

JUMP_COUNT=0;   // number of times apeak double last peak while(x<XMAX)
    {   while(*ei<=ZERO && x<XMAX)  // find next rising zero xing
        {   spectrum(PROCESS,*ei); ei++; x++;   }
        apeak[i]=*ei; xpeak[i]=x; esum[i]=0;
        while(*ei>ZERO && x<XMAX)       // find peak
        {   spectrum(PROCESS,*ei);
            esum[i]+=((*ei)-ZERO);
            if (*ei>apeak[i])
            {   apeak[i]=*ei; xpeak[i]=x;
            }
            ei++; x++;
        }
        xz[i]=x;    // save time (x) location of falling zero cross
        // if zero crossings are close together (ie. small period)
```

```
        // choose the larger apeak of the two and save its energy sum       //
     (esum) if apeak double last one, indicate amplitude jump in    // JUMP_COUNT
           if (i)
           {
5          if (apeak[i]>apeak[i-1] && apeak[i]-ZERO>>1>apeak[i-1]-ZERO)
     JUMP_COUNT++;
           if (xz[i]-xz[i-1]>MAX_PERIOD)
              esum[i]=0;
           else if (xz[i]-xz[i-1]<MIN_PERIOD)
10         {  if (apeak[i]>apeak[i-1])
              {  xpeak[i-1]=xpeak[i]; apeak[i-1]=apeak[i];
                 esum[i-1]=esum[i]; xz[i-1]=xz[i];
              }
           }
15         else if (x<XMAX)
              i++;
        }
        else
           i++;
20      }
        esmax=i;    // number of event samples
     } void process_events(void)
25   // go though every event (i) and mark the event (mark[i]) as // being an
     amplitude peak (APEAK), energy sum (ESUM), and energy // peak (EPEAK)
     {   int i,thresh,max_apeak=0;

// find largest esum and apeak of frame
30      for (i=0;i<esmax;i++)
        {  if (esum[i]>max_esum)
              max_esum=esum[i];
           if (apeak[i]>max_apeak)
              max_apeak=apeak[i];
35      }

// check for ESUM
        // mark any esum event that is >3/4 of the last esum event
        i=0;
40      thresh=max_esum-(max_esum>>2);
        while (i<esmax-1)
        {  mark[i]=NOTHING;       // clear marker for new frame
           if (esum[i]>thresh)
           {  mark[i]=ESUM;
45            thresh=esum[i]-(esum[i]>>2);
           }
           i++;
        }

50      // check for EPEAK
        // mark big esum in the sequence small-big-small
        // if big greater than 75% of the last big esum
        // thresh=max_esum-(max_esum>>2);
        // start with thresh=3/4 of largest esum
55      for (i=2;i<esmax;i++)
        {  if (esum[i]<esum[i-1] && esum[i-1]>=esum[i-2] && esum[i-1]>thresh)
           {  mark[i-1]+=EPEAK;
              thresh=esum[i-1]-(esum[i-1]>>2);
           }
60      }
```

```
    // check for APEAK
    // mark big apeak in the sequence small-big-small
    // if bis is greater than 75% of the last big apeak
    // thresh=max_apeak-(max_apeak>>2);
    // start with thresh=3/4   of largest apeak
    for (i=2;i<esmax;i++)
        {    if   (apeak[i]<apeak[i-1]   &&    apeak[i-1]>=apeak[i-2]    &&
apeak[i-1]>thresh)
        {   mark[i-1]+=APEAK;
            thresh=apeak[i-1]-(apeak[i-1]>>2);
        }
    }
} int bubble(void)
// replace oldest raw period entry in s[] ring buffer with new // raw_period
// sorts s[] in ascending order by bubble sort algorithm
// a position pointer is used to keep track of the oldest sample
{   int i,j,change=YES,center,temp,temp1,bublen;
    unsigned long avg=0;
    static lastp;          // last pitch estimate if (best_channel>2)   // channel=3 when no channel (0,1,2) is            //
good
        return(lastp);    // so return last valid pitch estimate
    i=0;
    for (j=0;j<BUFFER_LEN;j++)
        if (s[best_channel][j]!=NO_PITCH)   // don't include unvoiced         //
period
            bub[i++]=s[best_channel][j];     // update oldest sample
    bublen=i;

while(change)
    {   change=NO;
        for (i=0;i<bublen-1;i++)
        {   if (bub[i+1]<bub[i])
            {   temp=bub[i+1];              // swap sample
                bub[i+1]=bub[i];
                bub[i]=temp;
                temp=bubptr[i+1];
                bubptr[i+1]=bubptr[i];      // swap position pointer
                bubptr[i]=temp;
                change=YES;
            }
        }
    }
    lastp=bub[bublen>>1];                   // get center value
    return(lastp);
} void determine_best_channel(void)
// Find the channel with the least pitch errors.  A pitch error // is
detected when adjacent periods vary by more than a fixed // threshold
(ERROR_EIGHTS).
// A channel looses if ther are no events for that channel, or if // more
than half of the event samles are errors.  If no channel // wins, channel
```

3 (the dummy error channel) is selected to tell // the rest of the program no channel is good.
```
     { int i,j,p,error[3],min;

5        for (i=0;i<3;i++)
           error[i]=0;

// find best channel by selecting channel with smallest variation // error
      if neighboring pitches> ERROR_EIGHTS apart
10       for (i=0;i<BUFFER_LEN;i++)
         { for (j=0;j<3;j++)
              if       (s[j][i]==NO_PITCH        ||     (s[j][i+1]>s[j][i]       &&
      s[j][i+1]>s[j][i]+ERROR_EIGHTS)             ||     (s[j][i+1]<s[j][i]       &&
      s[j][i+1]+ERROR_EIGHTS<s[j][i]))
15              error[j]++;
         } for (j=0;j<3;j++)
            if (count[j]==0)    // force channel to loose if 0 events
20             error[j]=FORCED_ERROR;

// force channels to loose if error > 50 %
         for (j=0;j<3;j++)
            if (error[j]<<1>BUFFER_LEN)
25             error[j]=FORCED_ERROR;

// find best channel as channel with smallest number of errors
         min=FORCED_ERROR;
         for (i=0;i<3;i++)
30          if (error[i]<min)
            { min=error[i];
              best_channel=i;
            }

35       if (min==FORCED_ERROR)   // no good channel, indicate so
              best_channel=3;        // by choosing channel 3, an invalid    //
      dummy channel WILDNESS=min;              // pitch wildness indicated by pitch     //
40    variation
         for (i=0;i<3;i++)
           count[i]=0;
         return;
      }
45
      void process_markers(void)
      // Create three channels of markers based on occurance of event // markers;
      //       Channel 0= EPEAK or APEAK or ESUM
      //               1= EPEAK and ESUM
50    //               2= APEAK and ESUM
      { int i=0,lastxz0,lastxz1,lastxz2,p,first0=YES,first1=YES,first2=YES;
        int ptemp;

for (i=0;i<esmax;i++)
55       { // check Channel 0 for EPEAK or APEAK or ESUM
           if (mark[i])
           { if (first0)
               first0=NO;
             else
60           { p=xz[i]-lastxz0;
```

```
                count[0]++;
                if (p>MIN_PERIOD && p<MAX_PERIOD && esum[i]>VOICED_THRESH)
                    s[0][(++sptr[0])%BUFFER_LEN]=get_log(p);
                else
                    s[0][(++sptr[0])%BUFFER_LEN]=NO_PITCH;
            }
            lastxz0=xz[i];
        }
        // check Channel 1 for EPEAK and ESUM
        if (mark[i]&EPEAK && mark[i]&ESUM)
        {   if (first1)
                first1=NO;
            else
            {   p=xz[i]-lastxz1;
                count[1]++;
                if (p>MIN_PERIOD && p<MAX_PERIOD && esum[i]>VOICED_THRESH)
                    s[1][(++sptr[1])%BUFFER_LEN]=get_log(p);
                else
                    s[1][(++sptr[1])%BUFFER_LEN]=NO_PITCH;
            }
            lastxz1=xz[i];
        }
        // check Channel 2 for APEAK and ESUM
        if (mark[i]&APEAK && mark[i]&ESUM)
        {   if (first2)
                first2=NO;
            else
            {   p=xz[i]-lastxz2;
                count[2]++;
                if (p>MIN_PERIOD && p<MAX_PERIOD && esum[i]>VOICED_THRESH)
                    s[2][(++sptr[2])%BUFFER_LEN]=get_log(p);
                else
                    s[2][(++sptr[2])%BUFFER_LEN]=NO_PITCH;
            }
            lastxz2=xz[i];
        }
    }
} int get_max(int p)
// return the largest value of the last PBUFFER samples
// This reduces jitter when channels are changed by selecting the // maximum pitch of the last several (PBUFFER) pitch samples.
{   int i,max=0;

pbuf[pptr++%PBUFFER]=p;
    for (i=0;i<PBUFFER;i++)
        if (pbuf[i]>max)
            max=pbuf[i];
    return(max);
} unsigned get_pitch(int command)
// START initializes the pitch tracker
// END turns off the pitch tracker
// READ returns WAITING if a frame of sound has not been been // completed
or returns a pitch value and starts the next frame // of sound collection.
{   int pout;

if (command==START)
```

```
            return(start_pt());
        else if (command==END)
            return(end_pt());
        else if (command==READ)
        {   if (ct_voice_status)
                return(WAITING);
            else
            {   fill_energy(vi+LEADER);
                process_events();
                process_markers();
                determine_best_channel();
                record();
                pout=get_max(bubble());
                return(pout);
            }
        }
        return(SETUP_ERROR);
} void main()
// This is the main program loop. It starts the graphics and // pitch
tracker, and plots pitch and prints pitch value at the // top of the screen
in units
// of eights of semitones.  The program ends when a keystroke is //
detected.
{   int x,y,p,lastx,lasty;

_setvideomode(_VRES16COLOR);
    get_pitch(START);
    _setcolor(YELLOW);
    while (!kbhit())
    {   if (x+6>XMAX)
        {   _clearscreen(_GCLEARSCREEN);
            x=0;
        }
        if (p=get_pitch(READ))
        {   x+=6;
            y=YMAX-(p-300<<1);
            if (x<lastx)
                _moveto(x,y);
            else
                _moveto(lastx,lasty);
            _lineto(x,y);
            lastx=x;
            lasty=y;
            _settextposition(1,1);
            spectrum(RESULT,0);      // updates BRIGHTNESS, VOLUME and      //
WHISTLE
            printf("PITCH: %3d BRIGHTNESS: %3d ",p,BRIGHTNESS);
            printf("VOLUME: %3d WHISTLE: %3d ",VOLUME,WHISTLE);
        }
    }
    get_pitch(END);
    _setvideomode(_DEFAULTMODE);
}
```

APPENDIX 2
Copyright 1994 Thomas Zimmerman

```
#if 0
-------------------------------------------------------------------
    PT1.C   Pitch tracker for singing coach
-------------------------------------------------------------------
    Message on top of each new screen
-------------------------------------------------------------------
endif include <io.h>
include <dos.h>
#include <bios.h>
#include <stdio.h>
#include <fcntl.h>
#include <string.h>
#include <stdlib.h>
#include <graph.h>
#include <sbc.h>
#include <sbcvoice.h>
#include "loaddrv.c"
#include "c:\qc2\include\song.h"

#define  SPACE_BAR  0x20
#define  BLACK      0
#define  BLUE       1
#define  GREEN      2
#define  CYAN       3
#define  RED        4
#define  MAGENTA    5
#define  BROWN      6
#define  WHITE      7
#define  GRAY       8
#define  L_BLUE     9
#define  L_GREEN    10
#define  L_CYAN     11
#define  L_RED      12
#define  L_MAGENTA  13
#define  YELLOW     14
define  B_WHITE    15 define  NOTHING    0     // no marker
define  PEAK       1     // low-high-low with 3/4 of last high
#define  ESUM       2     // 1/2 power of last peak
#define  APEAK      4     // large apeak in sequence small-large-small
#define  TEST_PEAK  7     // tests for PEAK,ESUM, or APEAK marker
#define  PROCESS    1
#define  RESULT     0
#define  PCENTER    128   // 0 voltage of ADC
define  PCENTER2   256 define  MAX_PERIOD 300
define  MIN_PERIOD 10
#define  YMARK      70
#define  EC_SIZE    100
#define  MAX_EC     300   // 50 Hz
#define  MIN_EC     30    // 500 Hz
#define  ZERO       128
#define  B_LEN      8
#define  S_LEN      8
```

```
#define  LEADER      10    // first samples are wacky so ignore
#define  TRAILER     10    // last samples are wacky so ignore
#define  MAX_SAMPLES XMAX-100
#define  VOICED_THRESH 100 // energy must be above this to register as voiced
#define  DEBUG        2
#define  WHISTLE_THRESH 30
define  WHISTLE_ESUM  180 int color[]={BLUE,BLUE,L_BLUE,L_BLUE,L_CYAN,L_CYAN,CYAN,B_WHITE,RED};
int xpeak[EC_SIZE],apeak[EC_SIZE],esum[EC_SIZE],xz[EC_SIZE],mark[EC_SIZE];
int b[B_LEN],bp[B_LEN];
unsigned bptr,scount[2],spin[2],spout[2];
int s[3][S_LEN];
int plog[400];
int esmax,BRIGHT=0,WHISTLE=0;
int VOICED=NO,PURITY=0,JUMP_COUNT=0,ZCOUNT,BRIGHTNESS;
unsigned char TC,PACK;
int TERMINATE=NO;
unsigned long SAMPLE_COUNT=0;
int best_channel=0,pitche,pitchp,vcount=0;
int max_esum,max_apeak;

char far vi[MAX_SAMPLES+LEADER+TRAILER+4];

void load_plog(void)
{  int num_read;
   FILE *efile;

if ((efile=fopen("ptable.dat","rb"))==NULL)
      printf("LOAD ERROR: could not open PTABLE.DAT for load");
   else
   {  num_read=fread(plog,sizeof(int),400,efile);
      // printf("LOADED %d items from PTABLE.DAT\n",num_read);
   }
   fclose(efile);
} void message(void)
{  printf("Pitch is vertical scale. Time is horizontal scale. Tonal quality is color.\n");
   printf("         PURE==blue-light  blue-light  cyan-cyan-white==NASAL, MAGENTA=WHISTLE   \n");
} int get_log(int p)
{
   if (p<MAX_PERIOD && p>MIN_PERIOD)
      return(plog[p]);
   else
      return(0);
} int bubble(int channel)
/* replace oldest raw period entry in s[] ring buffer with raw_period */
/* sorts s[] in ascending order by bubble sort algorithm */
/* returns center value of sorted raw periods */
{  int i,change=YES,center,temp,a;
   unsigned long avg=0;
```

```
        while(spout[channel]<spin[channel])
        {   bptr++;                        /* was pointing at last sample entered */
                                           /* now pointing to the oldest sample */
            bptr%=B_LEN;            /* wrap around */
            for (i=0;bp[i]!=bptr;i++);   /* find oldest sample */
            b[i]=s[channel][(spout[channel]++)%S_LEN];          /* update oldest sample */
        }
        while(change)
        {   change=NO;
            for (i=0;i<B_LEN-1;i++)
            {   if (b[i+1]<b[i])
                {   temp=b[i+1];    /* swap sample */
                    b[i+1]=b[i];
                    b[i]=temp;
                    temp=bp[i+1];
                    bp[i+1]=bp[i]; /* swap position pointer */
                    bp[i]=temp;
                    change=YES;
                }
            }
        }

/* return average of two center values */
        a=B_LEN>>1;
        temp=(b[a]+b[a-1])>>1;
        return(temp);
} void spectrum(int cmd,int a)
/* count the number of zero crossings          */
{   static unsigned b,slope,scount,hfcount,sign,acc,x;

if (cmd==PROCESS)
    {   if (a<ZERO && sign)
        {   sign=0;
            ZCOUNT++;
        }
        else if (a>ZERO)
            sign=1;
        return;
    }
    else
    {   if (BRIGHT=ZCOUNT>31)
            BRIGHT=31;
        if (ZCOUNT>WHISTLE_THRESH)
            WHISTLE=ZCOUNT;
        else
            WHISTLE=0;
        BRIGHTNESS=ZCOUNT;
        ZCOUNT=0;
        return;
    }
} void fill_energy(unsigned char far *ei)
{   int x=0,i=0;
```

```
    JUMP_COUNT=0;   // number of times apeak > 50% of last peak while(x<XMAX)
    {   while(*ei<=ZERO && x<XMAX)      // find next rising zero crossing
        {   spectrum(PROCESS,*ei); ei++; x++;   }
        apeak[i]=*ei; xpeak[i]=x; esum[i]=0;
        while(*ei>ZERO && x<XMAX)       // find peak
        {   spectrum(PROCESS,*ei);
            esum[i]+=((*ei)-ZERO);
            if (*ei>apeak[i])
            {   apeak[i]=*ei; xpeak[i]=x;
            }
            ei++; x++;
        }
        xz[i]=x;                        // save x location of falling zero cross
                                        // if ec close together choose larger apeak
        if (i)
        {   if (apeak[i]>apeak[i-1] && apeak[i]-ZERO>>1>apeak[i-1]-ZERO)
                JUMP_COUNT++;
            if (xz[i]-xz[i-1]>MAX_EC)
                esum[i]=0;
            else if (xz[i]-xz[i-1]<MIN_EC)
            {   if (apeak[i]>apeak[i-1])
                {   xpeak[i-1]=xpeak[i]; apeak[i-1]=apeak[i];
                    esum[i-1]=esum[i]; xz[i-1]=xz[i];
                }
            }
            else if (x<XMAX)
                i++;
        }
        else
            i++;
    }
    esmax=i;
} void decay_ec(void)
{   int i,decay,thresh;

max_esum=0,max_apeak=0;

for (i=0;i<esmax;i++)
    {   if (esum[i]>max_esum)
            max_esum=esum[i];
        if (apeak[i]>max_apeak)
            max_apeak=apeak[i];
    }

/* mark any es that is >3/4 of the last esum */
    i=0;
    thresh=max_esum-(max_esum>>2);
    while (i<esmax-1)
    {   mark[i]=NOTHING;
        if (esum[i]>thresh)
        {   mark[i]=PEAK;
            thresh=esum[i]-(esum[i]>>2);
        }
        i++;
    }
```

```c
    /* mark high esum in the sequence low--high--low */
    /* make sure it's greater than 75% of the last high peak */
    thresh=max_esum-(max_esum>>2);  // start with thresh=3/4 of largest esum
    for (i=2;i<esmax;i++)
    {   if (esum[i]<esum[i-1] && esum[i-1]>=esum[i-2] && esum[i-1]>thresh)
        {   mark[i-1]+=ESUM;
            thresh=esum[i-1]-(esum[i-1]>>2);
        }
    }

/* mark high apeak in the sequence low--high--low */
    /* make sure it's greater than 75% of the last high peak */
    thresh=max_apeak-(max_apeak>>2);   // start with thresh=3/4 of largest apeak
    for (i=2;i<esmax;i++)
    {       if    (apeak[i]<apeak[i-1]    &&    apeak[i-1]>=apeak[i-2]    && apeak[i-1]>thresh)
        {   mark[i-1]+=APEAK;
            thresh=apeak[i-1]-(apeak[i-1]>>2);
        }
    }
} void plot_energy(int x, int i)
{   static oldy;
    int eavg,y;

_setcolor(RED);
    eavg=(esum[i]);
    y=YMAX-(eavg>>2);
    if (!x)
        _moveto(x,y);
    else
        _moveto(x-1,oldy);
    _lineto(x,y);
    oldy=y;
} int about_equal(int a,int b)
/* if a=b within 6% return YES, else NO */
{   int temp;

if (b>a)
    {   temp=a; a=b; b=temp; }
    if (a-(a>>4)>b)
        return(NO);
    else
        return(YES);
} int about_equal2(int a,int b)
{   int temp;

if (b>a)
    {   a=temp; a=b; b=temp;
    }
    {   if ( ((a-b)<<1)<a)
            return(YES);
        else
            return(NO);
```

```
        }
    } void process_markers(void)
5   {   static p;
        int i,tp=999,te=999,ta=999,updatea=NO,updatee=NO,pe,pa,temp;

// setting tp=te=ta=999 prevents first marker from being processed
    // first period is time between first and second marker
10
        for (i=0;i<esmax;i++)
        {   if (mark[i])
            {   if (xz[i]>tp)
                {   temp=xz[i]-tp;
15                  if (temp>MIN_PERIOD && temp<MAX_PERIOD)
                    {   pitchp=s[0][(spin[0]++)%S_LEN]=get_log(temp);
                        scount[0]++;
                        if (esum[i]>VOICED_THRESH)
                            vcount++;
20                  }
                }
                tp=xz[i];
            }
            if (mark[i]&ESUM && mark[i]&PEAK)
25          {   if (xz[i]>te)
                {   updatee=YES; pe=xz[i]-te; }
                te=xz[i];
            }
            if (mark[i]&APEAK && mark[i]&PEAK)
30          {   if (xz[i]>ta)
                {   updatea=YES;pa=xz[i]-ta;  }
                ta=xz[i];
            }
            if (updatee && updatea)
35          {   updatee=updatea=NO;
                if (about_equal(pa,pe))
                    p=(pa+pe)>>1;
                else if (about_equal(pa,p))
                    p=pa;
40              else
                    p=pe;
                if (p>MIN_PERIOD && p<MAX_PERIOD)
                {   pitche=s[1][(spin[1]++)%S_LEN]=get_log(p);
                    scount[1]++;
45              }
            }
        }
    }

50  unsigned log(unsigned int p)
    {   if (p<10)
            return(p);
        p=plog[p];
        return(p);
55  } int filter(int p)
    {   static p0,p1,pout;

60      p0=bubble(p);
```

```c
    pout=(log(p0)+log(p1))>>1;
    p1=p0;
    return(pout);
} int determine_best_channel(void)
/* counts number of times successive pitches differ by more than a semitone
*/
/* selects channel with smallest number of semitone deviations */
/* if esum/apeak hasn't updated, it looses automatically */
{   int i,j,error[2];
    static channel;

for (i=0;i<2;i++)
       error[i]=0;
    /* find best channel by selecting channel with smallest variation */
    for (i=0;i<S_LEN;i++)
    {   for (j=0;j<2;j++)
           if    ((s[j][i+1]>s[j][i]   &&    s[j][i+1]>s[j][i]+8)    ||
 (s[j][i+1]<s[j][i] && s[j][i+1]+8<s[j][i]))
              error[j]++;
    }
    //    printf("scount:    %2d    %2d         error:    %2d    %2d
\n",scount[0],scount[1],error[0],error[1]);
    if (scount[1]<1)       // force ch 1 to loose if <  1   event
       error[1]=99;
    if (error[0]<error[1])
       channel=0;
    else
       channel=1;
    best_channel=channel;
    PURITY=error[channel];
    return(channel);
} void end_pt(void)
/* terminates recorder */
{
    ctvm_terminate() ;
} void start_record(void)
{   ctvm_input(vi,MAX_SAMPLES+LEADER+TRAILER,15000);
    return;
} int start_pt(void)
/* return 1 if ok */
{   extern  char far * near voice_drv;
    char    far *lpVoiceBuf ;
    int i;

/* Retrieve the BLASTER environment settings */
    if ( ! GetEnvSetting() )
    { if (sbc_check_card() & 4)
       {  if (sbc_test_int())
          { if (sbc_test_dma() >= 0)
             { if (voice_drv = LoadDriver("CT-VOICE.DRV"))
                { if (!ctvm_init())
                   { ctvm_speaker(0) ;
```

```
                    for (i=0;i<B_LEN;i++)      // initialize bubble array
                    {   s[0][i]=0;
                        s[1][i]=0;
                        b[i]=0;
                        bp[i]=i;
                    }
                    bptr=0;
                    spin[0]=spin[1]=spout[0]=spout[1]=0;
                    load_plog();
                    start_record();
                }
            }
        }
        else
            printf("Error on DMA channel.\n");
    }
    else
        printf("Error on interrupt.\n");
}
else
    printf("Sound Blaster Card not found or wrong I/O settings.\n") ;
}
else
    printf("BLASTER environment not set or incomplete or invalid.\n");
} int check_voiced()
/* sound is voiced if more than half of the esum peaks (vcount) are voiced
*/
{   int v=NO;

if ( (vcount<<1) > scount[0] )
        v=YES;
    vcount=0;
    return(v);
} unsigned get_pitch(int command)
{   int channel;
    static p;

if (command==START)
        return(start_pt());
    else if (command==END)
        return(end_pt());
    else if (command==READ)
    {   if (ct_voice_status)
            return(WAITING);
        else
        {   fill_energy(vi+LEADER);             //    tom
            decay_ec();
            process_markers();
            channel=determine_best_channel();
            VOICED=check_voiced();
            spectrum(RESULT,0);
            p=bubble(channel);
            spout[0]=spin[0];       // point to location of first new sample
            spout[1]=spin[1];
            start_record();
```

```
            return(p);
        }
    }
    return(SETUP_ERROR);
} pragma loop_opt (off)

pragma loop_opt()

#if 1
main()
{   int p,x,y,oldx,oldy,oldxw,oldyw,i,col,vol,tone,semi,eights;

_setvideomode(_VRES16COLOR);
    get_pitch(START);
    while(!kbhit())
    {   p=get_pitch(READ);
        if (p)
        {   x+=8;
            if (DEBUG==1)
            {   _settextposition(3,15);
                printf(" e:%6d",max_esum);
            }
            if (DEBUG==2)
            {   _settextposition(32,1);
                if (WHISTLE && max_esum<WHISTLE_ESUM && !JUMP_COUNT)
                {   vol=64; tone=0;
printf("Brightness:   %3d  Volume: %4d   Whistle Pitch: %3d
    ",tone,vol,WHISTLE);
                }
                // else if (VOICED && PURITY<4)
                else if (VOICED)
                {   vol=max_esum-150>>2;  if (vol>127) vol=127; if (vol<0) vol=0;
                    tone=(BRIGHT>>2);
                    semi=p>>3; eights=p%8;
printf("Brightness: %3d   Volume: %4d    Voiced Pitch semi: %3d eights: %3d
",tone,vol,semi,eights);
                }
            }
            if (x>XMAX-8)
            {   x=8; _clearscreen(_GCLEARSCREEN); message();
            }
            if (WHISTLE && max_esum<WHISTLE_ESUM && !JUMP_COUNT)
            {   _setcolor(MAGENTA);
                y=YMAX-((WHISTLE-WHISTLE_THRESH)<<3);
                if (oldxw>x)
                    _moveto(x,y);
                else
                    _moveto(x-8,oldyw);

_moveto(x-8,y);   // line hack

_lineto(x,y);
                oldyw=y;
                oldxw=x;
            }
            else
            {   if (PURITY>7)
                    PURITY=7;
```

```
            col=BRIGHT>>2;
            if (!col)
               col=1;
            _setcolor(color[col]);
            y=YMAX-((p<<1)-600);
            // if (oldx>x || !VOICED || PURITY>4)
            if (oldx>x || !VOICED)
               _moveto(x,y);
            else
               _moveto(oldx,oldy);
            _moveto(x-8,y);    // line hack
            _lineto(x,y);
            oldy=y;
            oldx=x;
         }
      }
      scount[0]=scount[1]=0;
   }
   get_pitch(END);
   _setvideomode(_DEFAULTMODE);
}
#endif
```

I claim:

1. A music training apparatus for teaching a student correct pitch and other musical skills by reference to a stored or pre-recorded musical sequence, comprising:

display means for presenting a live image visible to the student, means for receiving a monophonic reference source and sending a variable signal in accordance therewith to the visual display means, so that the display means shows a sequence of pitch values, the monophonic reference source comprising desired pitches to be achieved by the student, means for providing an audible tone reference to the student in unison with the monophonic reference source and sharing the same fundamental sequence of tones as the monophonic reference source, pickup means for picking up intonations made by the student in attempting to follow the audible tone reference to produce a digitized waveform, means to detect amplitude and summed energy of digitized waveforms, means to produce a plurality of pitch determinations from the digitized waveform, means to choose one of said plurality of pitch determinations and produce a pitch track signal, and computer means for receiving pitch track signals from the pitch tracker means and for generating a signal to the display means, to display visually a temporal history of the series of intonations made by the student, superimposed with the desired sequence of pitch values as represented by the monophonic reference source and shown on the display.

2. The apparatus of claim 1 wherein the monophonic reference source comprises an audible tone, and including a second pitch tracker means receiving the monophonic reference source, the second pitch tracker means generating a signal to the computer means, which in turn is used to generate the display of the monophonic reference source pitches on the visual display means.

3. The apparatus of claim 2, wherein the audible tone reference includes the monophonic reference source.

4. The apparatus of claim 2, wherein the monophonic reference source comprises a live, unrecorded intonation.

5. The apparatus of claim 1, wherein the computer means includes means for presenting the student's intonations and the desired sequence of pitch values in a scrolling format moving across the display means.

6. The apparatus of claim 5, wherein the display means includes monophonic display means for displaying the pitch of the monophonic source as a line whose vertical position increases with the pitch of the monophonic source.

7. The apparatus of claim 6, wherein the computer means and the display means include pitch display means for displaying the pitch of the student's intonation as a line whose vertical position increases with the pitch of the student's intonation, in a format visually similar to the line displayed for the monophonic reference source.

8. The apparatus of claim 1, further including means associated with the computer means and the visual display means for displaying in advance a section of the desired sequence of pitch values in a display format visually similar to the display format used to display said temporal history of the series of intonations made by the student.

9. The apparatus of claim 1, further including amplitude determination means for providing information on the display means relating to the student's amplitude as well as meter and pitch.

10. The apparatus of claim 9, wherein the computer means includes means for displaying pitch as height of a line segment on the display means, and amplitude as thickness of the line on the display means.

11. The apparatus of claim 1, further including means to determine spectral brightness of the digitized waveform for providing information on the display means relating to the student's timbre as well as meter and pitch.

12. The apparatus of claim 11, wherein the computer means further includes means for displaying pitch as height of a line segment on the display means, and timbre as color of the line on the display means.

13. The apparatus of claim 12, wherein said means to determine spectral brightness comprises means to determine and count the number of zero crossings of said digitized waveform.

14. The apparatus of claim 1, further including means for digitally storing in the computer means a brief history of the audible tone reference and of the visual display relating to the monophonic reference source for a selected interval, for replay audibly and on the visual display means as desired.

15. The application of claim 1, wherein the audible tone references comprises a polyphonic music source.

16. The application of claim 1, wherein the monophonic reference source comprises a note event list.

17. The application of claim 16, wherein the audible tone reference comprises a series of tones produced from the note event list.

18. The application of claim 16, wherein the means for providing an audible tone reference comprises a stereo audio tape recording having one channel with the note event list as the monophonic reference source, and another channel carrying the audible tone reference.

19. The apparatus of claim 16, wherein the monophonic reference source further comprises encoded lyrics.

20. The apparatus of claim 16, wherein the monophonic reference further comprises encoded computer commands with means for causing further features to be displayed on the display means.

21. The apparatus of claim 1, wherein the means for providing an audible tone reference comprises a stereo recording having one channel carrying audible tones as the monophonic reference source and another channel carrying the audible tone reference.

22. The apparatus of claim 21, wherein the audible tones of the monophonic reference source comprise solo singing.

23. The apparatus of claim 1, wherein the computer means further includes means for representing as two different lines of different brightness on the display means, the sequence of pitch values from the monophonic reference source and the series of intonations made by the student.

24. The apparatus of claim 1, wherein the monophonic reference source comprises a pre-recorded sequence.

25. The apparatus of claim 1, wherein the computer means and display means include means for visually displaying musically related pitches to the monophonic reference source.

26. The apparatus of claim 1, wherein the monophonic reference is stored on audio tape.

27. The apparatus of claim 1, wherein the monophonic reference is stored on compact disk.

28. A music training apparatus for teaching a student correct pitch and other musical skills by reference to a stored or pre-recorded musical sequence, comprising:

a display;

a storage system to store the pre-recorded musical sequence;

an audio input transducer which converts sound made by a student into a digitized waveform; and a processing system coupled to the display, the storage system, the audio output transducer and the audio input transducer, the processing system including resources which
- send a variable signal to the display in accordance the pre-recorded musical sequence, so that the display shows a sequence of pitch values,
- pick up intonations made by the student through the audio input transducer in attempting to follow the sequence of pitch values,
- detect features of frames of the digitized waveform,
- produce a plurality of pitch determinations based on the detected features for the frames,
- choose one of said plurality of pitch determinations and produce a pitch track signal, and
- cause the display to graphically depict a temporal history of the series of intonations indicated by the pitch track signal, superimposed with the desired sequence of pitch values.

29. The music training apparatus of claim 28, further including:

a audio output transducer; and resources in the processing system which provide an audible tone reference to the student through the audio output transducer, in response to the pre-recorded musical sequence and sharing the same fundamental sequence of tones as the pre-recorded musical sequence.

* * * * *